(12) United States Patent
Seguin et al.

(10) Patent No.: US 7,853,437 B2
(45) Date of Patent: *Dec. 14, 2010

(54) ELECTROMAGNETIC EMISSIONS STIMULATION AND DETECTION SYSTEM

(75) Inventors: Sarah A. Seguin, Rolla, MO (US);
Daryl G. Beetner, Rolla, MO (US);
Todd H. Hubing, Clemson, SC (US)

(73) Assignee: The Curators of the University of Missouri, Rolla, MO (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/325,856

(22) Filed: Dec. 1, 2008

(65) Prior Publication Data

US 2009/0216498 A1    Aug. 27, 2009

Related U.S. Application Data

(63) Continuation of application No. 11/771,192, filed on Jun. 29, 2007, now Pat. No. 7,464,005.

(51) Int. Cl.
*G06F 15/00* (2006.01)
*G01S 3/00* (2006.01)
(52) U.S. Cl. .................. 702/189; 342/463
(58) Field of Classification Search .......... 702/74, 702/75, 124, 189; 342/452, 463, 464, 465; 703/13, 14, 20, 21; 455/561, 562.1
See application file for complete search history.

(56) References Cited

U.S. PATENT DOCUMENTS

| | | | |
|---|---|---|---|
| 4,053,891 A | 10/1977 | Opitz | |
| 5,191,343 A | 3/1993 | Danzer et al. | |
| 5,430,392 A | 7/1995 | Matejic | |
| 5,717,656 A | 2/1998 | Dourbal | |
| 5,856,803 A | 1/1999 | Pevler | |
| 5,990,791 A | 11/1999 | Andreasen et al. | |
| 6,163,259 A | 12/2000 | Barsumian et al. | |
| 6,359,582 B1 | 3/2002 | MacAleese et al. | |
| 6,580,915 B1 | 6/2003 | Kroll | |

(Continued)

OTHER PUBLICATIONS

Hubing et al, Electromagnetic Detection and Identification of Automobiles, Euroem 2004, Jul. 16, 2004, Magdeburg, Germany.

(Continued)

*Primary Examiner*—Bryan Bui
(74) *Attorney, Agent, or Firm*—Polsinelli Shughart PC

(57) ABSTRACT

A system and method for detecting and identifying electronic devices based on their unintended electromagnetic emissions ("UEE") signals is presented. During device classification, UEE signals are measured from a plurality of test devices and characteristic data is obtained from the UEE signal emitted from each test device. Using the characteristic data, a threshold value and ideal pulse template can be determined for each test device and stored in a memory. An ideal stimulation signal is also determined for each test device and stored in the memory. During device detection, the ideal stimulation signal is applied to the environment in which a target device is suspected of being located. Stimulated UEE signals are measured from the target device and processed. The processed measurement data is compared to stored power threshold values and ideal pulse templates to determine if the target device is present.

20 Claims, 17 Drawing Sheets

U.S. PATENT DOCUMENTS

| | | | |
|---|---|---|---|
| 6,639,541 B1 * | 10/2003 | Quintana et al. | 342/18 |
| 6,765,492 B2 | 7/2004 | Harris | |
| 6,765,527 B2 | 7/2004 | Jablonski et al. | |
| 6,850,735 B2 | 2/2005 | Sugar et al. | |
| 6,895,343 B2 | 5/2005 | Jacobsen et al. | |
| 6,897,777 B2 | 5/2005 | Holmes et al. | |
| 6,993,438 B2 | 1/2006 | Jacobsen et al. | |
| 7,162,285 B2 | 1/2007 | Owens et al. | |
| 7,317,419 B2 | 1/2008 | Sugar et al. | |
| 2004/0183712 A1 | 9/2004 | Levitan et al. | |
| 2004/0218714 A1 | 11/2004 | Faust | |
| 2006/0038677 A1 | 2/2006 | Diener et al. | |
| 2006/0082488 A1 | 4/2006 | Keller, III | |

OTHER PUBLICATIONS

Dong et al., Identification of Vehicles Based on Their Electromagnetic Emissions, UMR EMC Laboratory, Oct. 2004, 17 pages.

Weng et al., Unintended Radiation from Improvised Explosive Devices, UMR EMC Laboratory, Oct. 2004, 24 pages.

Weng et al., Neural Network Detection and Identification of Electronic Devices Based on Their Unintended Emissions, Electromagnetic Compatibility Laboratory, University of Missouri-Rolla, May 2005, pp. 245-249.

International Search Report and Written Opinion for PCT/US08/64940 dated Feb. 4, 2009 (6 pages).

Beetner, et al., Detection and Location of Wireless Command-Initiated Improvised Explosive Devices (IED), University of Missouri-Rolla Electromagnetic Compatibility Laboratory, Rolla, dated Jul. 30, 2004, pp. 2-7.

Koehler, Scientists work on a way to alert soldiers to hidden explosive devices, News-Leader.com, Springfield, Missouri, dated Oct. 24, 2004.

* cited by examiner

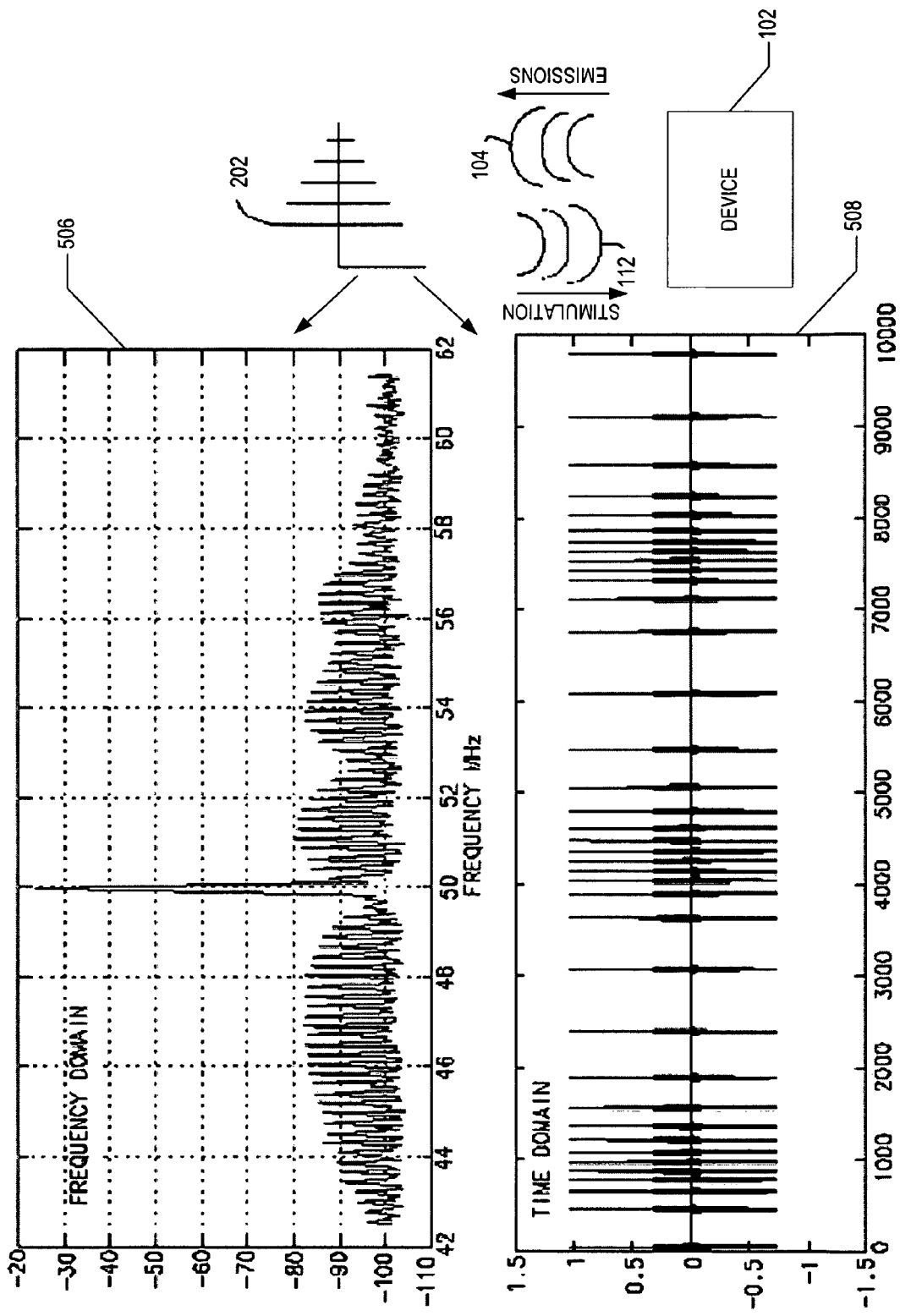

ELECTROMAGNETIC EMISSIONS STIMULATION AND DETECTION SYSTEM

RELATED APPLICATIONS

This application is a continuation of prior application Ser. No. 11/771,192, filed Jun. 29, 2007.

FIELD

The present document relates to the field of electromagnetic emissions detection, and more particularly to the field of detecting unintentional electromagnetic emissions of electronic devices such as improvised explosive devices.

BACKGROUND

Improvised explosive devices ("IEDs") are insidious tools used by terrorists and insurgents that can cause injury or death to armed service personnel and civilians. Typically constructed with common, inexpensive components, IEDs can be hidden along roads, in vehicles, in buildings, and many other locations, and, thus can hinder the ability of troops to maneuver effectively in combat zones. Most IEDs employ radio receivers and/or low-cost electronic circuits that allow for remote detonation. Critical to reducing the threats posed by IEDs is the development of systems and methods that allow for effective detection and location of IEDs from safe distances.

Active electronic devices radiate or emit electromagnetic energy either intentionally or unintentionally, and these emissions can be used to detect and locate electronic devices from which these emissions are being emitted. One conventional method for detecting the presence of an electronic device involves using a so called "bug scanner" or non-linear junction detector. The non-linear junction detector detects non-linear junctions such as would be found in an electronic device containing a semiconductor. The non-linear junction detector transmits a signal and receives harmonics of the transmitted signal that are re-radiated by a non-linear junction. This technology can be difficult to use in a noisy environment due to the large number of non-linear junctions that are responsive to this type of stimulation. For example, a rusty nail can respond in the same manner as an electronic device. In addition, such bug scanners must be used in very close proximity to the device or at an extremely high power level. As a result, bug scanners are not an effective means for detecting IEDs because the operator must be in close proximity to the IED, which can place the operator at risk of injury or death, and because it may be impractical or impossible to obtain the desired power level required to operate the bug scanner at safer distances when it is being used in remote areas.

Other conventional systems have been designed to determine if a known electronic device is active. For example, such systems can be used to determine if a cell phone has been powered on during a flight on an airplane. However, this detection technology involves exploiting the knowledge of intentional electromagnetic emissions to identify the active electronic device and would not function for a device that does not intentionally emit electromagnetic emissions like an IED.

There are various industrial and defense applications that would greatly benefit from identifying and classifying electronic devices using their unintended emissions. For example, the detection of unauthorized devices aboard airplanes or the detection of improvised explosive devices (IEDs) in noisy ambient environments are examples of such applications.

SUMMARY

According to one embodiment, unique unintended emissions from a specific device may be used for detection. Various techniques are used to process the unintended electromagnetic emissions of an electronic device for identification.

In one aspect, a computerized system for detecting a target electronic device emitting an unintentional electromagnetic emission (UEE) signal within an area is provided. The system includes a classification component that receives the UEE signal emitted from each of one or more test electronic devices while located in each of a noise controlled environment and a non-noise controlled environment, identifies a unique characteristic of the UEE signal emitted from each of one or more test electronic devices, and stores the identified unique characteristic of the UEE signal from each test device as unique characteristic data in a memory. The system further includes a stimulation component for transmitting an ideal stimulation signal within the area in response to input received from an input device, wherein the target electronic device is responsive to the stimulation signal to emit a stimulated UEE signal. The system also includes a detection component that receives the stimulated UEE signal, converts the received stimulated UEE signal to a digital signal, processes the digital signal to determine a characteristic of the stimulated UEE signal and to compare the determined characteristics to characteristic data stored in the memory, and generates an alert signal when the determined characteristics of the stimulated UEE signal matches characteristic data stored in the memory.

According to another aspect, a method is provided for detecting a target electronic device emitting an unintentional electromagnetic emission (UEE) signal within an area. The method includes receiving the UEE signal emitted from each of one or more test electronic devices while located in each of a noise controlled environment and a non-noise controlled environment. The method further includes identifying a unique characteristic of the UEE signal emitted from each of one or more test electronic devices. The method also includes storing the identified unique characteristic of the UEE signal from each test device as unique characteristic data in a memory. The method further includes transmitting an ideal stimulation signal within the area in response to input received from an input device. The target electronic device is responsive to the stimulation signal to emit a stimulated UEE signal. The method further includes receiving the stimulated UEE signal. The method further includes converting the received stimulated UEE signal to a digital signal. The method further includes processing the digital signal to determine a characteristic of the stimulated UEE signal and comparing the determined characteristics to characteristic data stored in the memory. The method further includes generating an alert signal when the determined characteristics of the stimulated UEE signal matches characteristic data stored in the memory.

According to another aspect, a computerized system for detecting a target electronic device emitting an unintentional electromagnetic emission (UEE) signal within an area is provided. The system includes a classification component that receives the UEE signal emitted from each of one or more test electronic devices while located in each of a noise controlled environment and a non-noise controlled environment, identifies a unique characteristic of the UEE signal emitted from each of one or more test electronic devices, stores the identified unique characteristic of the UEE signal from each test device as unique characteristic data in a memory, and determines a threshold value for each test device based on corresponding measured time domain and frequency domain characteristic data acquired in the non-noise controlled environment. The system includes a template component that defines an ideal pulse template for each test device based on corresponding measured time domain characteristic data stored in the memory. The system includes a detection component that: receives the UEE signal, converts the received UEE signal to a digital signal, processes the digital signal to determine a characteristic of the UEE signal and to compare the determined characteristics to characteristic data stored in the memory. The processing includes retrieving an ideal pulse template that correspond to a first test device identified in the memory, first correlating the digital signal with the retrieved ideal pulse template, second correlating the first correlation with a square wave to determine a normalized measure of similarity, comparing the normalized measure of similarity to a first threshold value stored in the memory that corresponds to the first test device, and generating an alert signal when the normalized measure of similarity is greater than or equal to the first threshold value. The system further includes a sound generator operatively coupled to the detection component that processes the alert signal and generates a unique sound indicative of a particular electronic device.

Additional objectives, advantages and novel features will be set forth in the description which follows or will become apparent to those skilled in the art upon examination of the drawings and detailed description that follows.

BRIEF DESCRIPTION OF THE DRAWINGS

FIG. 5B depicts a frequency domain plot and a time domain plot of unintended electromagnetic emission signals after stimulation;

Corresponding reference characters indicate corresponding elements among the several views. The headings used in the figures should not be interpreted to limit the scope of the figures.

DETAILED DESCRIPTION

Figure 1A:
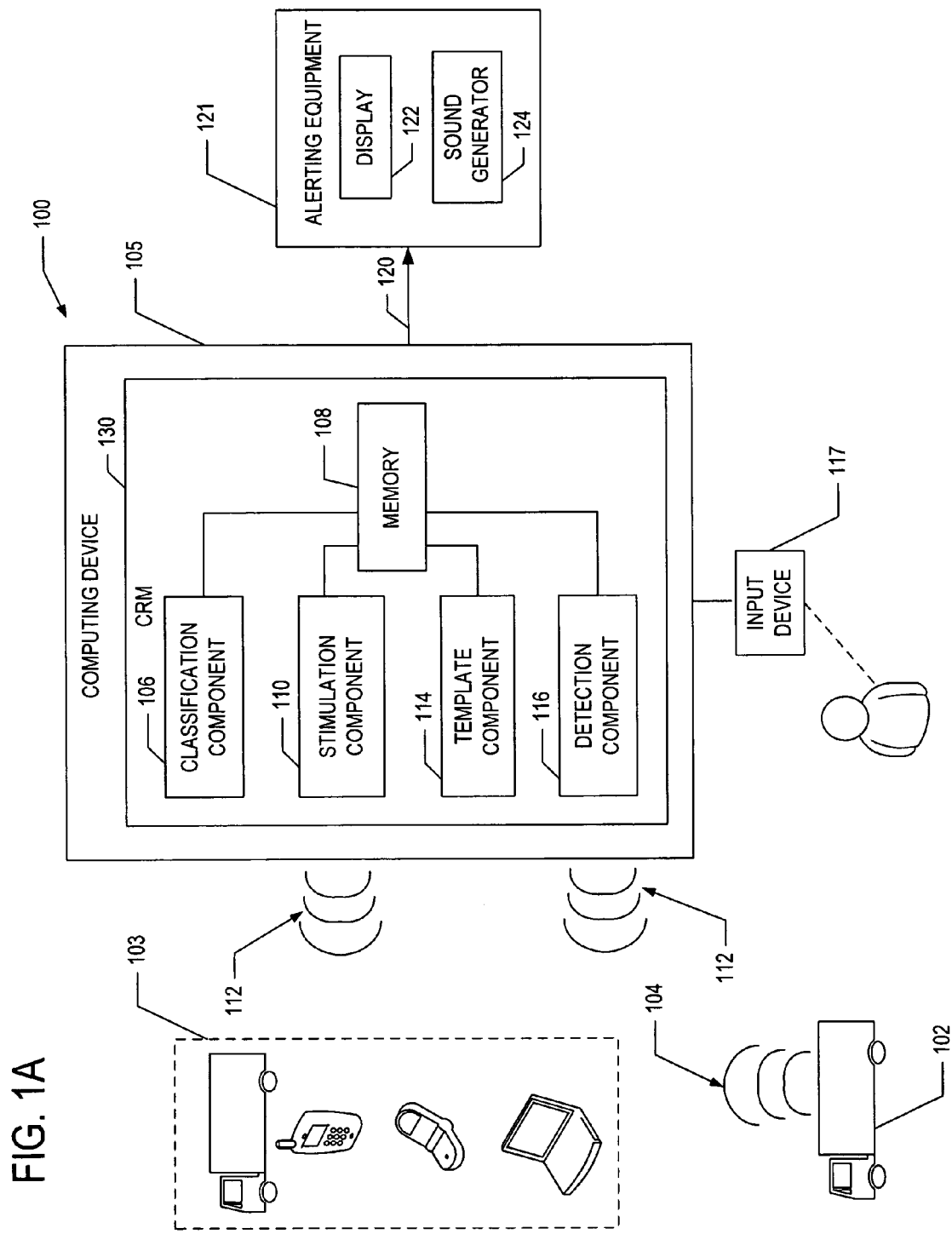
FIG. 1A is a simplified block diagram illustrating a suitable operating environment in which embodiments of the unintended electromagnetic emission detection system may be implemented.

Referring to the drawings, a system and method for implementing an unintentional electromagnetic emissions detection ("UEED") system is generally indicated as 100 in FIG. 1. As described above, all active electronic devices emit electromagnetic energy, either intentionally or unintentionally. It has been discovered that the unintentional electromagnetic emissions of electronic devices have specific qualities that can be used for detection. Although the UEED system 100 is described herein as being used to detect devices equipped with regenerative receivers, it is contemplated that the UEED can be used to detect unintended emissions from other devices that are not equipped with regenerative receivers.

Electronic devices can emit short electromagnetic pulses with unique characteristics. For example, characteristics of the short electromagnetic pulses emitted from a particular device, or class of device, can depend on the characteristics of the regenerative receiver used in the device, the internal electronics of the device, and internal signals within the device. The class of device refers to a group of devices that have substantially the same internal electronics and/or regenerative receiver. The individual short pulse for a regenerative receiver has an unusual time-frequency characteristic essentially amounting to a unique frequency modulation of the individual pulse. In other words, the frequency content of the pulse changes over time. This unique frequency modulation can distinguish a particular device that is radiating the short electromagnetic pulse from other devices. As such, precise detection of individual devices can be achieved by analyzing the unique frequency modulation.

As shown in FIG. 1A, a simplified block diagram illustrates a target electronic device ("target device") 102 equipped with a regenerative receiver that emits an unintentional electromagnetic emission ("UEE") signal, as indicated by reference character 104. According to an aspect of the UEED system 100, the presence and location of the target device 102 can be detected based on the emitted UEE signal 104.

Figure 1B:
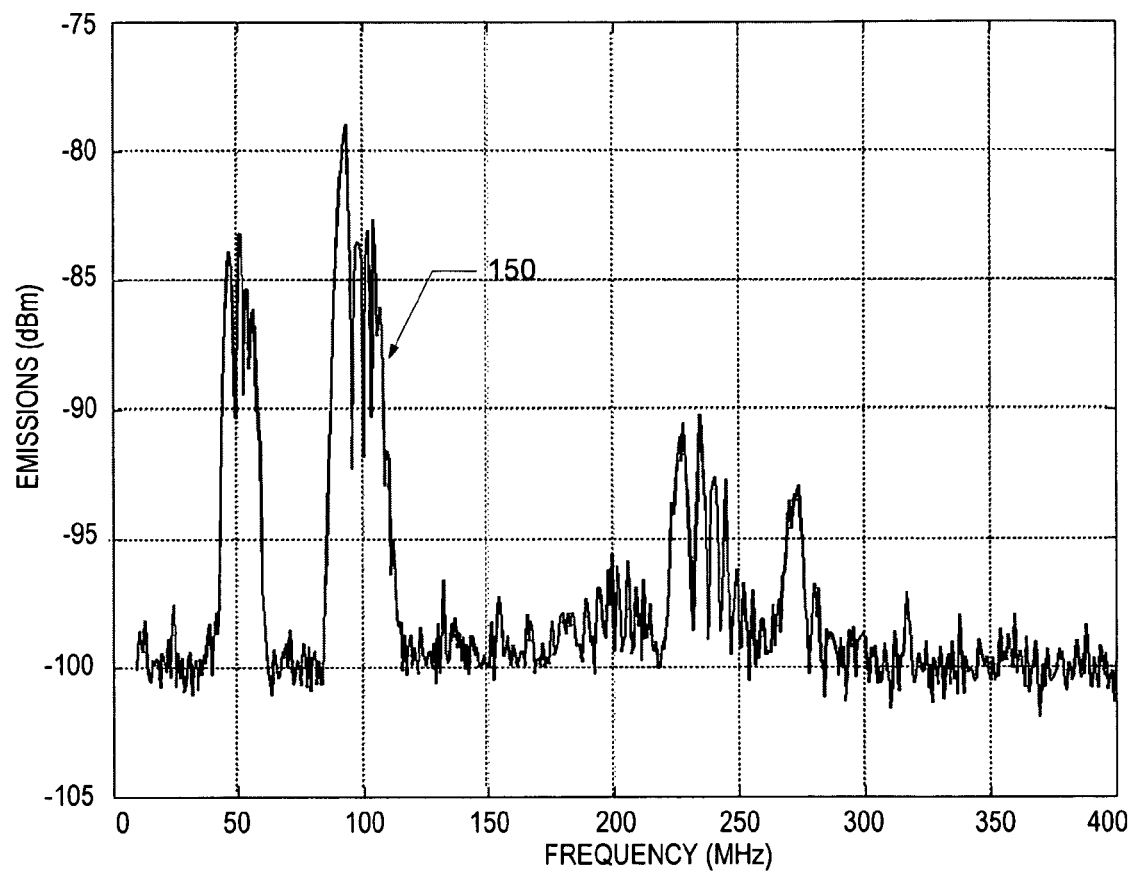
FIGS. 1B and 1C are plots of unintended electromagnetic emission signals radiating from a toy truck in the frequency and time domains, respectively.
Figure 1C:
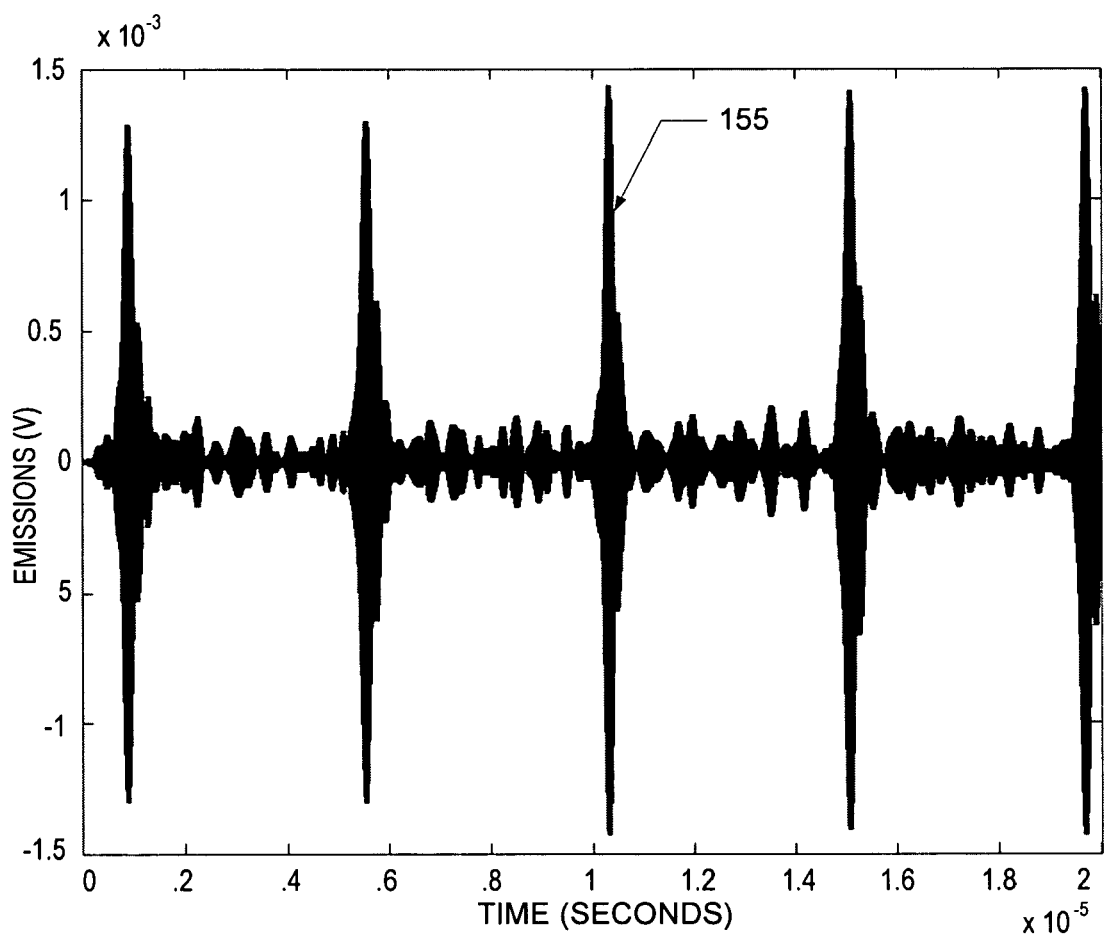
Figure 1D:
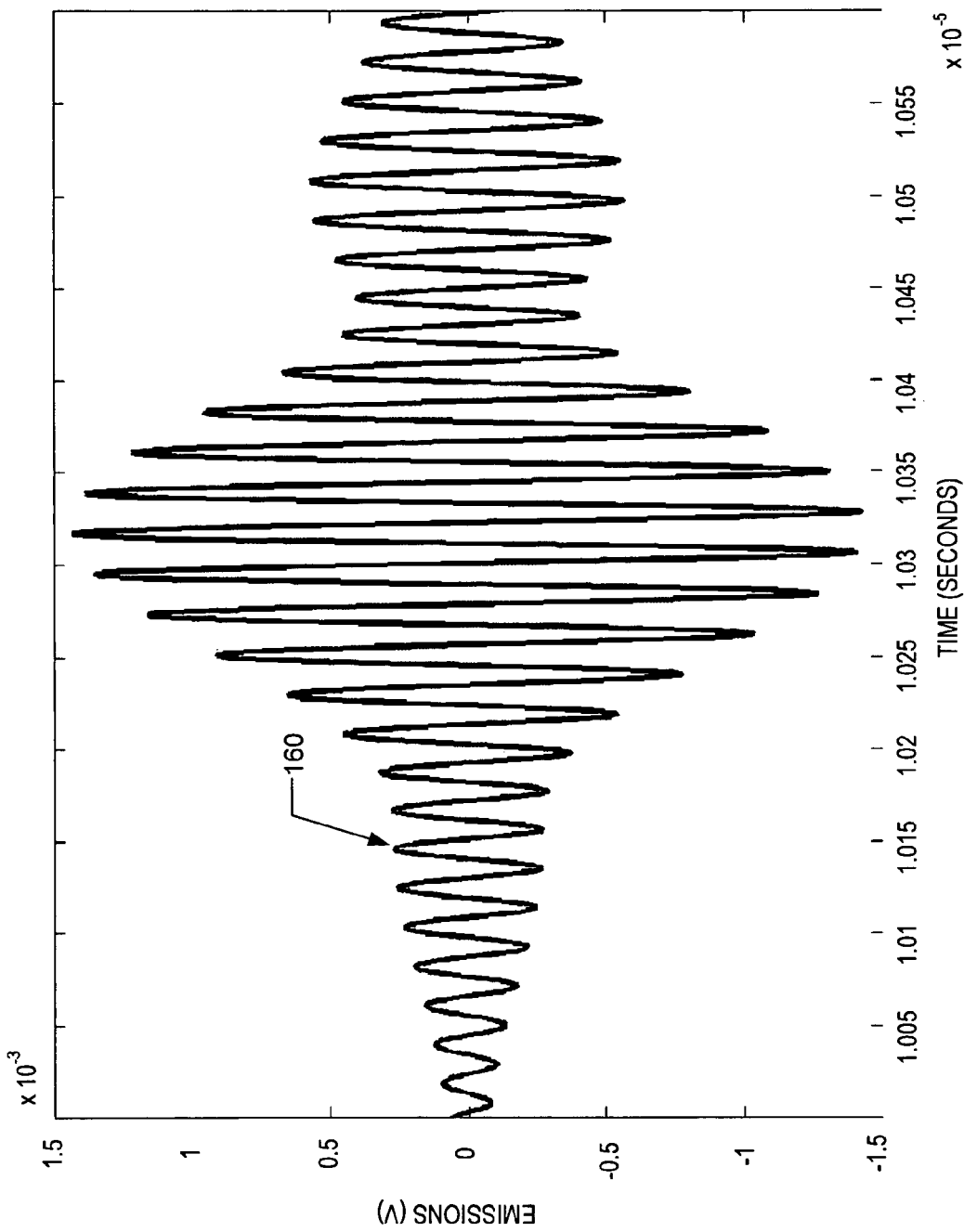
FIG. 1D depicts a single electromagnetic pulse radiating from a toy truck on a shorter timescale.

The unique UEE signal 104 for a given electronic target device 102 tends to be periodic and have a consistently shaped waveform in the time and frequency domains. For example, the UEE signal 104 emitted by a specific regenerative receiver, such as a radio controlled toy truck ("toy truck"), may consist of a short pulse containing high frequency elements around 50 MHz, and other frequencies, that repeats at a 200 kHz repetition rate. FIG. 1B shows a frequency plot 150 of the UEE signal 104 from a toy truck in the frequency domain, and FIG. 1C shows a time plot 155 of the UEE signal 104 from the toy truck in the time domain. FIG. 1D shows a single pulse 160 on a shorter timescale and corresponds to the third pulse shown in the time plot 155 in FIG. 1C.

In this instance, FIG. 1A diagrammatically shows a computing device 105 that comprises various operational components for facilitating device classification and device detection in accordance with aspects of the UEED system 100. Prior to detecting a particular target device 102, a classification process is performed to collect and store time and frequency domain measurement data for one or more test devices (e.g., toy trucks, walkie-talkies, cell phones, computers, etc.) 103. For example, a classification component 106 of the UEED system 100 can be executed by the computing device 105 to classify the test devices 103. The classification component 106 initially collects a series of time and frequency domain measurements of the UEE signal 104 produced by each of the test devices 103 in a low noise environment. Next, the collected time domain and frequency domain measurement data can be processed and key characteristic data of UEE signals 104 for each of the test devices 103 are determined and stored in a memory 108. Key characteristics of the UEE signal 104 can include the shape of the emission pulse, the rate of the emission pulse, and the frequency content of the emission pulse, and the frequency content of the signal over time. Any changes in UEE signal 104 characteristics that occur when the test devices 103 are subject to different noise conditions and environments can be determined and stored in the memory 108.

Due to drifting frequency, changing pulse shape, and other changing characteristics, the UEE signal 104 emitted from a particular target device 102 may not be consistent enough for processing, and, as a result detection, capabilities may be limited. For example, the pulse repetition rate for the inexpensive and widely used regenerative receiver found in the toy truck can vary by as much as twenty (20) percent to twenty-five (25) percent. In addition, other factors such as battery charge, temperature, and ambient noise levels can also alter the UEE signal 104. However, it has been observed that UEE signals 104 from devices 102 equipped with regenerative receivers respond to stimulation predictably, and that UEE signals 104 can be stimulated to be more consistent and, thus, easier to detect from greater distances.

A stimulation component 110 of the UEED system 100 can be executed by the computing device 105 to apply a stimulation signal, as indicated by arrow 112, to the target device 102 to stimulate the UEE signal 104 radiating from the target device 102. During the classification process, each of the test devices 103 is individually placed in a low noise environment and radiated with stimulation signals 112 at various known frequencies. The stimulation signal frequency that produce the best response in the UEE signal 104 can be observed and stored in the memory 108, and can later be used to modulate the UEE signal 104 emitted from that particular target device 102 during device detection.

A template component 114 can be executed by the computing device 105 to develop a template, or expected signal signature, for each of the test devices 103 based on the time domain measurements of their corresponding UEE signals 104. The template component 114 defines, for example, an ideal pulse template that contains information about the pulse shape and the changing frequency of the UEE signal 104 over time for each of the test devices 103.

A detection component 116 can be can be responsive to input received from an operator of an input device 117 of the computing device 105 to generate the known stimulation signal 112 to apply to the surrounding environment and can be configured to measure ambient noise levels in the environment. The measured ambient data can be digitized and processed by the computing device 105 or a digital signal processor (not shown). Processing can include comparing the digitized ambient data with measurement data and templates stored in the memory 108 to identify matching data, and, thus indicate whether a target device 102 is present. The detection component 116 can be responsive to identified matching data to generate an alert signal, as indicated by arrow 120, that is provided to an alert device 121 to notify the operator that the target device 102 is located within the vicinity. The alert device 121 can be a display 122 operatively coupled to the computing device 105 for providing a visual alert to the operator. The alert device 121 can also be a sound generator 124 operatively coupled to the computing device 105 for providing an audible alert to the operator. In one aspect of the UEED system 100, the sound generator 124 processes the alert signal 120 to produce an audible alert that the operator, if trained properly, can identify the type device 102 by listening to the audible alert. In other words, different devices 102 can each have a unique sound associated therewith such that the operator can be trained to identify the type of device based on the generated unique sound. For example, the measured UEE signal 104 from the toy truck 155 might be processed and played through a speaker so that the UEE signal 104 captured in 20 microseconds is played back in 2 seconds. In other words, the 50 Mhz UEE signal 104 becomes a 500 Hz audio signal.

The UEED system 100 illustrated in FIG. 1A may include a general purpose computing device (e.g., computing device 105), such as a computer executing computer-executable instructions. The computing device typically has at least some form of computer readable media (e.g., CRM 130). Computer readable media 130, which include both volatile and nonvolatile media, removable and non-removable media, can be any available medium that may be accessed by the general purpose computing device. By way of example and not limitation, computer readable media 130 may include computer storage media and communication media. Computer storage media 130 may further include volatile and nonvolatile, removable and non-removable media implemented in any method or technology for storage of information such as computer readable instructions, data structures, program modules or other data. Communication media may typically embody computer readable instructions, data structures, program modules, or other data in a modulated data signal, such as a carrier wave or other transport mechanism and include any information delivery media. Those skilled in the art will be familiar with the modulated data signal, which may have one or more of characteristics set or changed in such a manner that permits information to be encoded in the signal. The computing device 105 may include or be capable of accessing computer storage media in the form of removable and/or non-removable, volatile and/or nonvolatile memory. A user may enter commands and information into the computing device through the input device 117. Other input devices (not shown) may also be connected to the computing device 105. The computing device 105 may also operate in a networked environment using logical connections to one or more remote computers.

Other embodiments of the UEED system 100 are operational with numerous other general purpose or special purpose computing system environments or configurations. The UEED system 100 illustrated in FIG. 1A, is not intended to suggest any limitation as to the scope of use or functionality of the various embodiments of the UEED system 100. Moreover, the UEED system 100 should not be interpreted as having any dependency or requirement relating to any one or combination of components illustrated in the operating environment 100. Examples of well known operating systems, environments, and/or configurations that may be suitable for use in embodiments of the UEED system include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

For purposes of illustration, the UEED system 100 is described herein as collecting classification information from various devices and initiating device detection at a single computing device. However, in operation, it is contemplated that separate computing devices can be used for device classification and device detection."

Figure 2A:
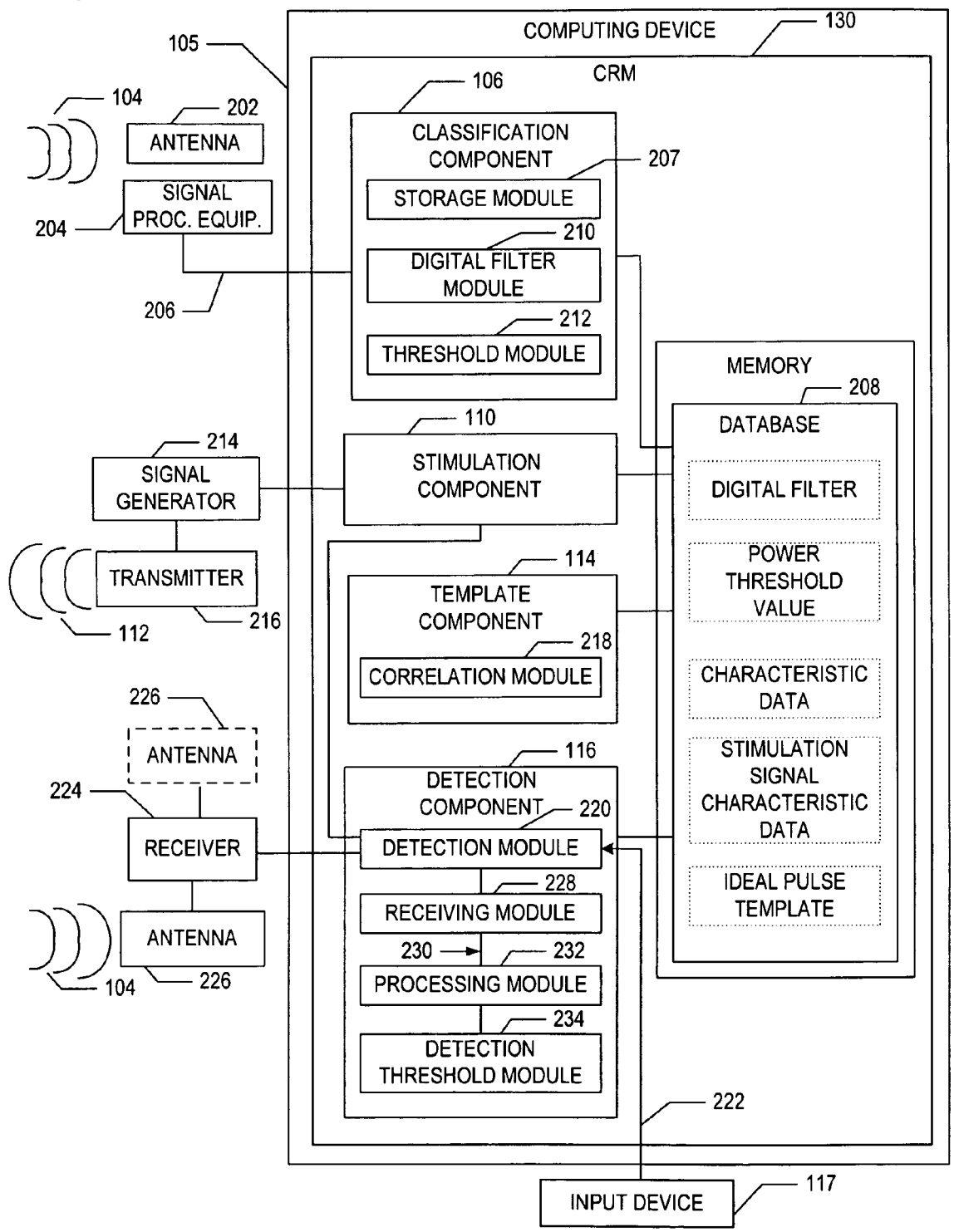
FIG. 2A is a simplified block diagram illustrating executable component modules according to one embodiment of the unintended electromagnetic emission detection system.

Referring to FIG. 2A, each of the operational components comprises one or more modules for facilitating device classification and device detection. As described above, classification involves acquiring a series of time and frequency domain measurements of UEE signals 104 for various devices. In order to obtain accurate measurements of UEE signal 104, the target device 102 can be placed in a low ambient noise controlled environment such as a semi-anechoic chamber (not shown).

Prior to acquiring time and frequency domain measurements of the UEE signal 104, the UEE signal 104 must be captured. An antenna 202 such as a Sunol Sciences JB5 biconnilog antenna can be used to capture the UEE signal 104 from the target device 102. The antenna 202 can be operatively coupled to a signal processing device 204 such an Agilent Infinium 54855A DSO oscilloscope and a Rohde and Schwarz FSEB spectrum analyzer that measure time domain and frequency domain radiation characteristics, respectively, of the UEE signal 104. The frequency domain radiation characteristics can be acquired over a range of frequencies for which the particular controlled environment is designed. For example, frequency domain radiation characteristics for the toy truck were acquired over a range from 30 MHz to 5 GHz. As shown in FIG. 1B, the UEE signal 104 is not discernible (over the noise level) above 300 MHz. The time domain radiation signature was sampled at a rate of $2 \times 10^9$ samples per second for varying time periods. For the toy truck, 100 microseconds of data, containing 20 pulses that repeat at a rate of 200 kHz, was initially acquired. After extensive examination of the data it was determined that twenty (20) microseconds of data could efficiently and accurately detect the toy truck.

Referring back to FIG. 2A, key signal characteristics can be determined from the frequency and time domain measurements of UEE signals for each of the test devices 103. For example, as described above, the shape of the emissions pulse, the rate of emissions pulse, the frequency content of the emissions pulses, the change in frequency content over time, and the change in emissions characteristics when subject to different noise conditions and environments can be determined based on the frequency and time domain measurements. The signal processing device 204 can be operatively coupled to the computing device 105 by a standard communication interface 206, such as the General Purpose Interface Bus ("GPIB") 206.

The classification component 106 is responsive to measured time domain and frequency domain radiation characteristic data received from the signal processing device 204 to store the measured time domain and frequency domain radiation characteristic data in the memory 108. A storage module 207 of the classification component is operatively coupled to the signal processing device 204 and is responsive to measured characteristic data to store the measured characteristic data in an updatable database 208 located, for example, in the memory 108. The memory 108 can be readily updated as needed, for example as devices of interest change.

A digital filter module 210 of the classification component 106 can be executed to design a digital filter for each test device 103 based on the stored time domain and frequency domain radiation characteristic data to maximize the detection of each test device 103 when located in a noisy environment. As known to those skilled in the art, digital filters perform mathematical operations on an intermediate form of a signal to achieve a desired filtering effect. In this case, the digital filter module 210 designs a digital filter to maximize the capture of the radiation signature of the UEE signal 104 in the time domain for each test device 103. For example, the toy truck generates a pulse signal with a rate of emissions of 200 kHz. The primary frequency content of the generated pulse signal is about 50 MHz (FIG. 1B). The frequency content of this pulse varies consistently by ten (10) percent of 50 MHz, first starting slower, then increasing in frequency and, finally, decreasing in frequency. This results in a relatively broadband radiation at 50 MHz. As such, the digital filter designed to produce a filtered signal that is centered at 50 MHz with a bandwidth of 25 MHz to maximize the capture most of radiation signature of the UEE signal 104 in the time domain for the toy truck. The identified digital filter is stored in the database 208 and can be used later during device detection.

A threshold module 212 of the classification component 106 can be executed to determine a power threshold value for each test device 103. Initially, ambient condition measurement data is acquired in a non-noise controlled environment. In other words, each target device 102 being classified is placed outside of the low noise environment (e.g., outside of the semi-anechoic chamber) and measurement data is collected. Thereafter, the threshold module 212 uses measurement data collected under ambient conditions to develop a power threshold value for each test device 103 based on the power in the corresponding UEE signal 104. For example, a threshold value is calculated by running a statistically significant number of sample sets of data through the detection algorithm. These data consist of measurements that were acquired while the target device 102 was placed in an ambient noise environment and measurements acquired without the device present. The threshold value is determined from the power in the UEE signal 104 after executing a series of cross correlations, first with an ideal pulse and second with a series of square waves. This threshold value is a measure of the similarity between the measured data and each test device 103. Comparing the threshold calculated from these two sets of data (containing the target device and only ambient noise) a threshold is determined so that the false alarm rate is acceptably low while the detection rate is acceptably high. The computing device 105 stores the expected power threshold value in the database 208 for reference during detection.

Under certain conditions, UEE signals 104 being emitted from a device 104 may not be consistent enough for signal processing. However, by transmitting the stimulation signal 112 with a known magnitude and frequency within the vicinity of the target device 102 it is possible to stimulate the UEE signal 104 radiating from the target device 102 so that it can be analyzed by digital signal processing. When the target device 102 is a regenerative receiver, the frequency of the stimulation signal 112 is generally near the transmission frequency the receiver is designed to receive. Varying the frequency and/or a modulation characteristic of the stimulation signal 112 and measuring the affects on the UEE signal 104 can identify an ideal stimulation signal 112 that produces the best response in the UEE signal 104 (i.e., optimized UEE signal) for a particular device. For example, the optimized UEE signal may correspond to the stimulated UEE signal that has the most consistent pulse repetition rate. In one embodiment of the UEED system 100, the stimulation component 110 can be operatively coupled to a signal generator 214 such as a Hewlett Packard signal generator for generating a sinusoidal signal (i.e. stimulation signal 112) at various frequencies. Furthermore, the signal generator 214 can be operatively coupled to a transmitter 216 such as an unbalanced monopole antenna to transmit the sinusoidal signal to the test device 103.

Figure 3:
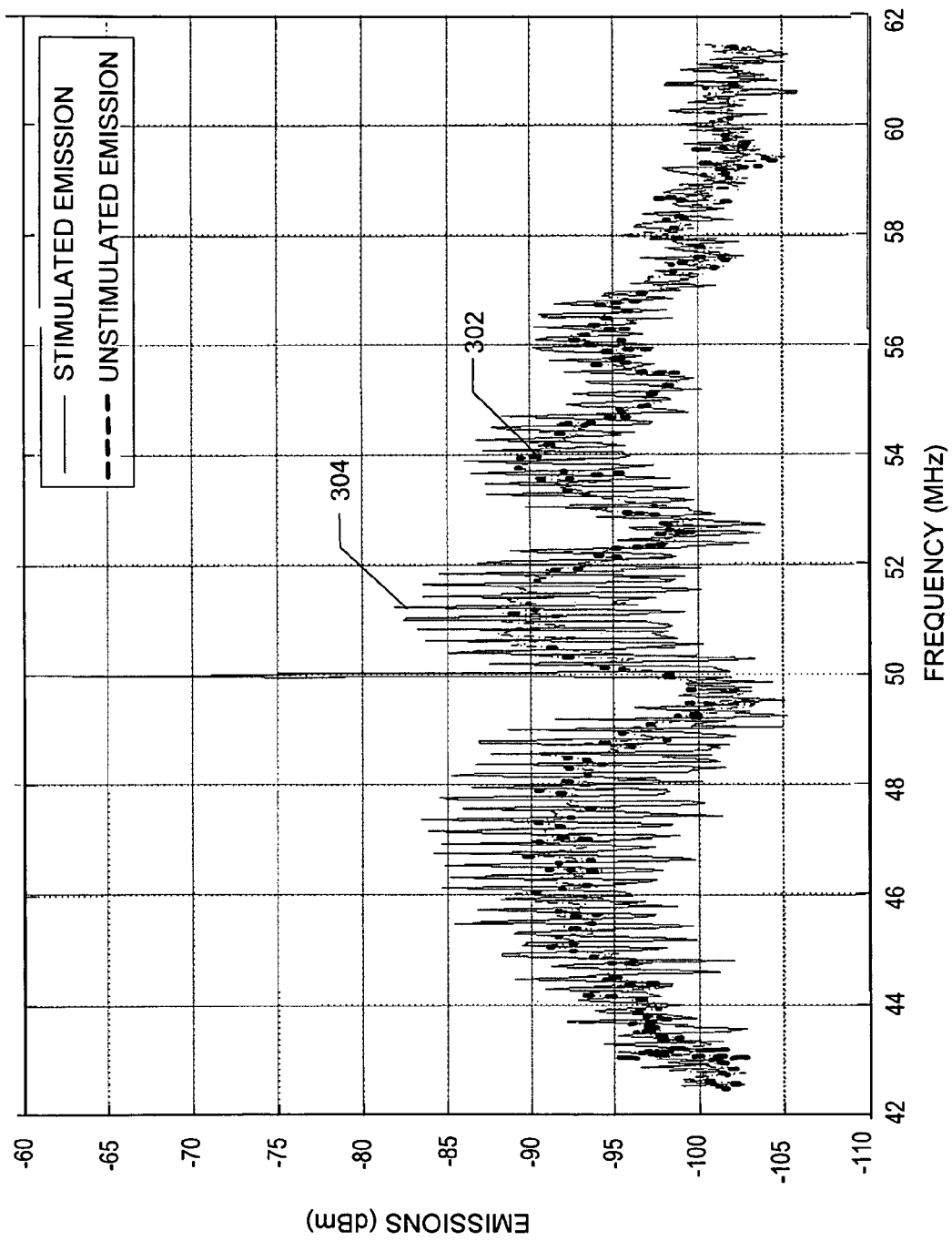
FIG. 3 is a plot of an unintended electromagnetic emission signal emitted from a toy truck before and after transmitting a stimulation signal.

In the example of the toy truck, consider that it has been determined that a 50 MHz sinusoidal signal produces the best response on the UEE signal 104 (i.e., optimizes the UEE signal 104) being emitted from the toy truck. FIG. 3 shows the UEE signal 104 of a toy truck before and after transmitting a 50 MHz sinusoidal signal. Line 302 (shown in phantom) corresponds to the frequency domain representation of the UEE signal 304 before stimulation and line 504 corresponds to the frequency domain representation of the UEE signal 104 after stimulation. As shown, the UEE signal 104 emitted from the toy truck is noticeably different when the 50 MHz sinusoidal signal is applied. In the time domain, this corresponds to a more consistent pulse repetition rate of about 200 kHz. In contrast, prior to stimulation, the 200 kHz pulse repetition rate of the UEE signal 104 from the toy truck varied by as much ten (10) percent.

Figure 4:
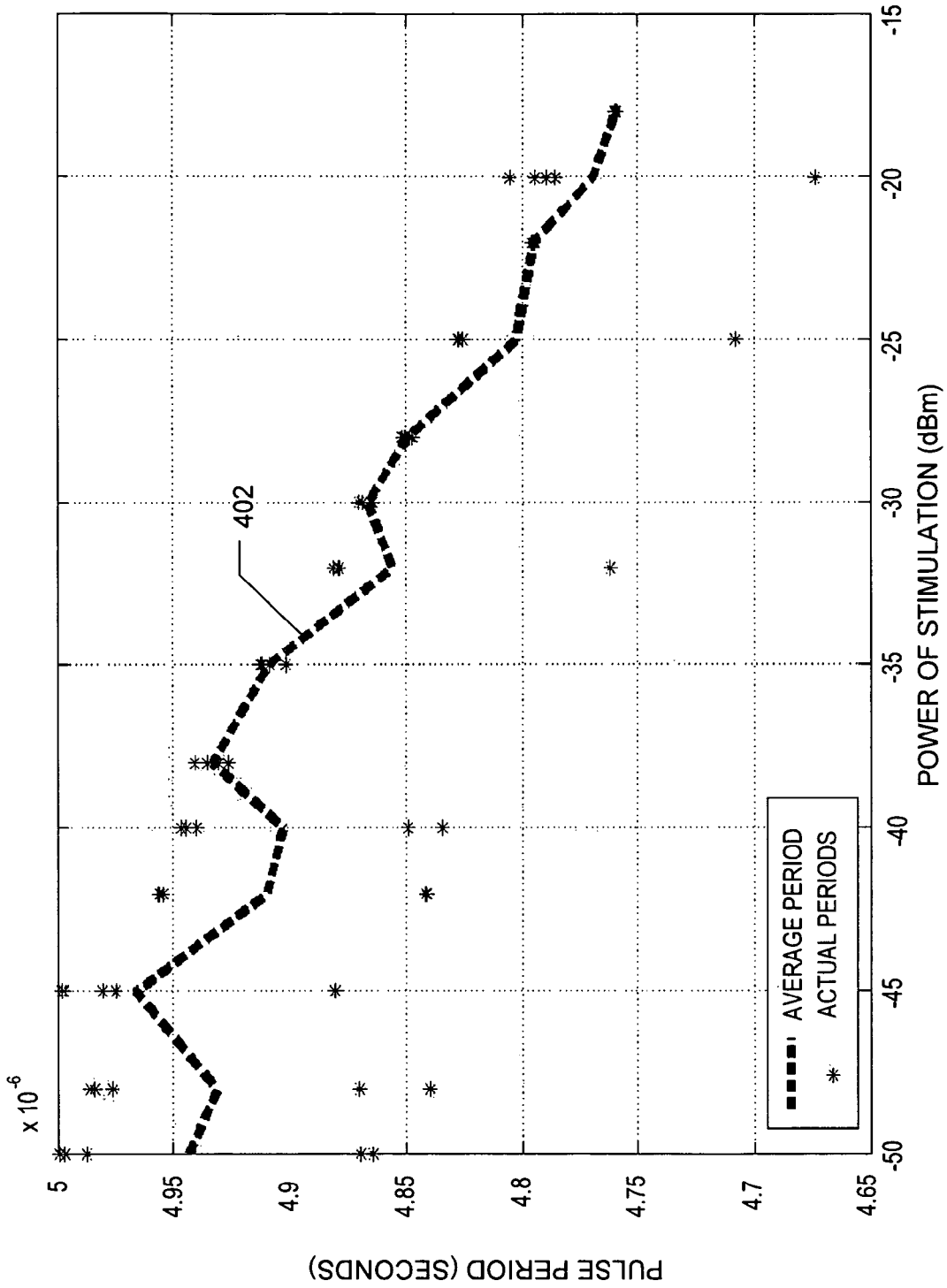
FIG. 4 is a plot of pulse repetition rate vs. stimulation signal power.
Figure 5A:
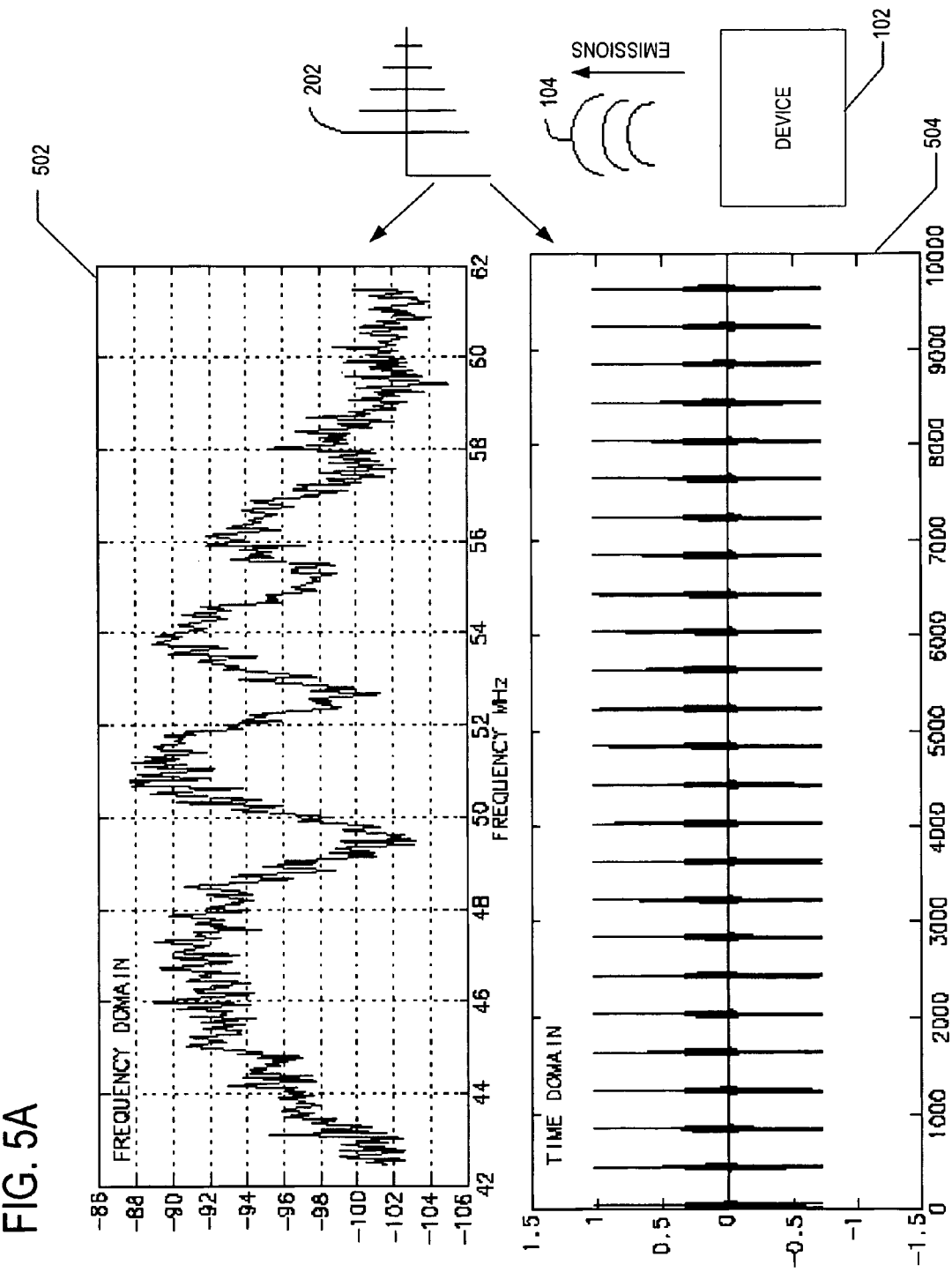
FIG. 5A depicts a frequency domain plot and a time domain plot of unintended electromagnetic emission signals prior to stimulation.

FIG. 4 depicts a plot 402 of pulse repetition rate versus stimulation signal power. It can be seen that the pulse repetition rate of the UEE signal 104 from toy truck also varies with respect to changes in magnitude (e.g. power) of the stimulation signal 112. FIG. 5A depicts a frequency domain plot 502 and a time domain plot 504 of UEE signal 104 prior to stimulation, FIG. 5B depicts a frequency domain plot 506 and a time domain plot 508 after stimulation. By comparing the frequency domain plots 502, 506 of the toy truck's UEE signal 104, it can be seen that the UEE signal 104 is altered after stimulation. Notably, the time domain plots 504, 508 shown in FIGS. 5A and 5B, respectively, are not actual measurements but are exaggerated diagrams used to depict the affects of an applied stimulation signal on the toy truck's UEE signal 104. The ability of the stimulation unit to control the UEE signal 104 from the device can be used to improve the ability to detect the device over passive detection and, in fact, to generally detect a class of devices (for example, regenerative receivers) based on their response to the stimulation.

Referring back to FIG. 2A, by observing the affects on the UEE signals 104 in response to changes in the magnitude and frequency of the stimulation signal 112, an ideal stimulation signal 12 can be identified for each test device 103, and the characteristics (e.g., frequency and magnitude) of the ideal stimulation signal 112 can be stored in database 208 via the computing device 105. For example, as described above, the frequency of the stimulation signal 112 that produces the best response in the UEE signal 104 being emitted from each test target device 102 is stored in the database 208 and can be used to modulate that particular device's UEE signal 104 during device detection. Notably, the antenna 202 and processing device 204 used to capture and measure, respectively, the frequency domain and time domain characteristics of the UEE signal 104 before stimulation can also be used to identify the stimulation signal 112 that produces the best response in the UEE signal 104. For example, the Sunol Sciences JB5 biconnilog antenna can be used to receive the UEE signal 104 after stimulation and the Agilent Infinium 54855A DSO oscilloscope and the Rohde and Schwarz FSEB spectrum analyzer can be used to measure time domain and frequency domain radiation characteristics, respectively, of the stimulated UEE signal 104. By analyzing the time domain and frequency domain measurements of the UEE signals 104 after applying stimulation signals 112 at various frequencies, the ideal stimulation signal 112 can be identified. Thereafter, the stimulation component 110 can store the measured characteristic data for the ideal stimulation signal 112 in the database 208.

The template component 114 executes a correlation module 218 to develop a pulse template for each target device 102. The correlation module 218 retrieves a random sampling of a statistically significant number of pulses obtained from all available time domain measurements in the database 208 for a particular electronic target device 102. Each of the retrieved pulses can be combined through a progressive cross-correlation process. A single correlation process is defined for discrete time as:

$$(f \star g)_i = \Sigma f_j^* g_{i+j} \quad (1).$$

The progressive cross-correlation process used to develop a pulse template involves iteratively correlating each pulse with the result of the previous correlation. After a statistically significant number of single pulses are randomly selected from all sets of measurement data collected during classification for the particular device, the first correlation combines two of the initially selected pulses out of the sample of pulses and normalizes the result. Thereafter, the result from the first correlation is successively correlated with another pulse and normalized until all selected pulses have been correlated and normalized. These correlations may be calculated in the frequency or time domains. The result of the correlations is referred to herein as an "ideal" pulse that is normalized to produce an ideal pulse template. The correlation module 218 stores the ideal pulse template in the database 208 for recall during device detection.

Figure 1E:
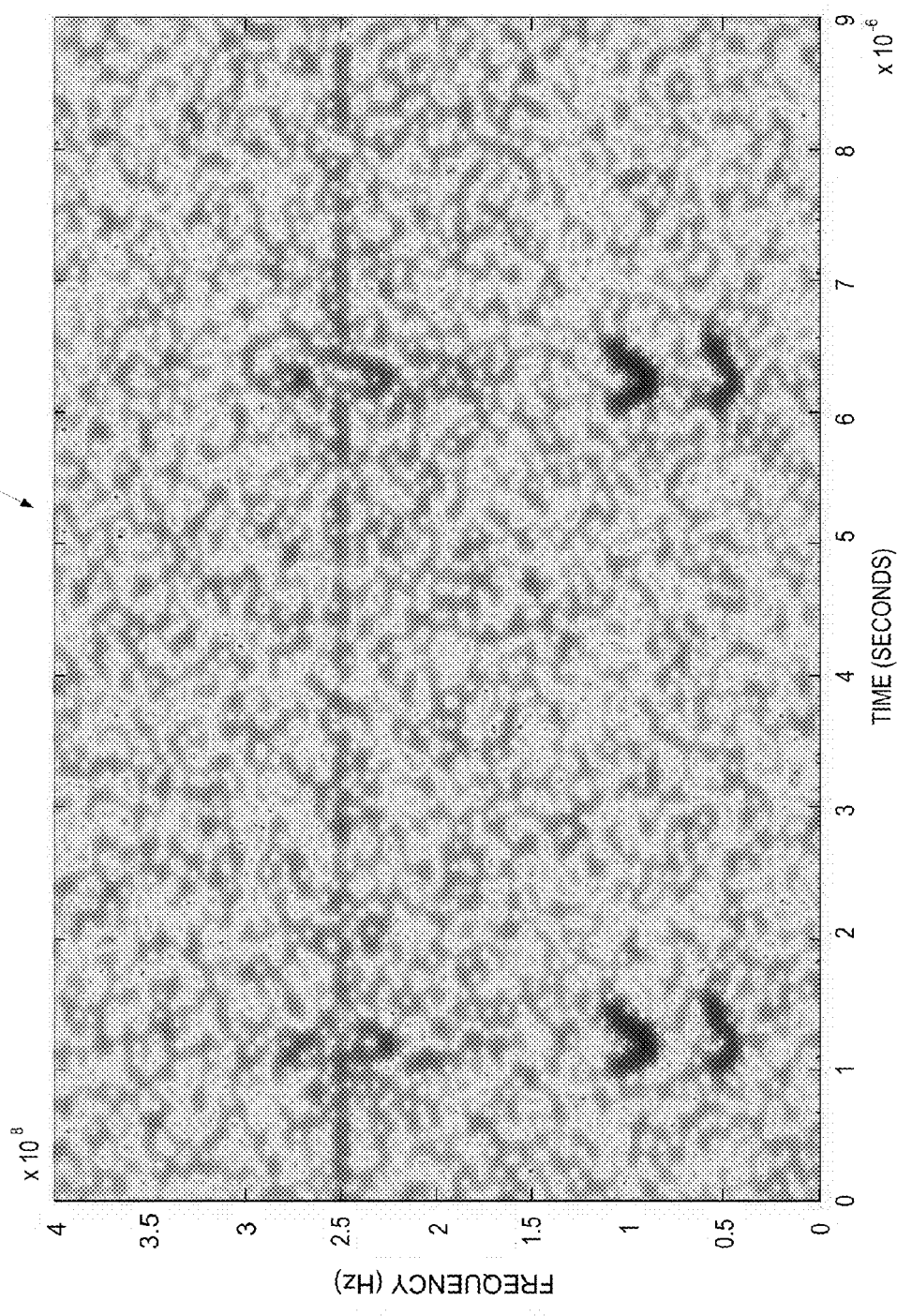
FIG. 1E is a time-frequency plot of two electromagnetic pulses radiating from a toy truck.
Figure 6:
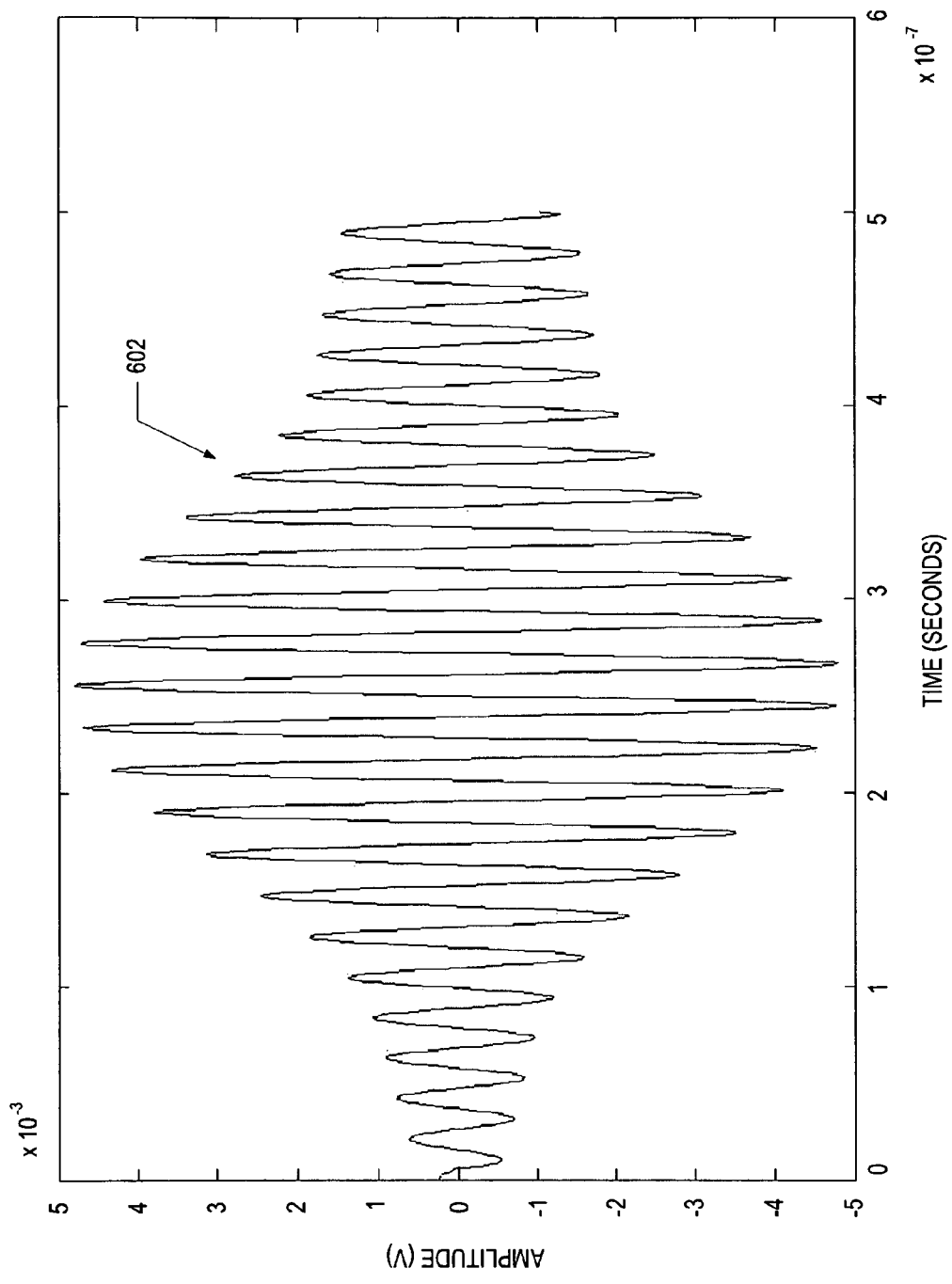
FIG. 6 is a plot of ideal pulse template for a toy truck according to one embodiment of the unintended electromagnetic emission detection system.

The ideal pulse template contains information about both the pulse shape of the UEE signal 104 and its changing frequency characteristic over time. For example, a single pulse for a regenerative receiver has an unusual time-frequency characteristic essentially amounting to a frequency modulation of an individual pulse (that is, the frequency content of the pulse changes over time). FIG. 1E is shows a time-frequency plot 160 of two pulses. As described above, this frequency modulation further distinguishes it from other devices allowing for more precise detection. As a result, the correlation process can effectively capture the unique frequency modulation of a specific regenerative receiver. For any target device 102 that emits an UEE signal 104, it is therefore possible to find a single pulse or "ideal pulse template" for use in a time domain correlation with measured emissions. A single "ideal" pulse template 602 for the toy truck attained from the correlate-shift-average procedure is shown in FIG. 6.

Referring again to FIG. 2A, the detection component 116 includes one or more modules for facilitating the detection of the target device 102. A detection module 220 of the detection component 116 can be responsive to a detection command, as indicated by 222, to identify a stimulation signal 112 to apply to the environment in an area in which a target device 102 is suspected of being located. The detection command 222 includes detection preference data and can be generated by an operator via the input device 117 operatively coupled to the computing device 105 or can be automatically generated by the computing device 105 at predetermined intervals. According to one aspect of the UEED system 100, the preference data included in the detection command 222 can correspond to a particular target device 102 for which detection is desired. The detection module 220 queries the database 208 to identify characteristic data of the ideal stimulation signal 112 that corresponds to the target device 102 identified in the detection command 222. For example, if the preference data indicates a toy truck, the frequency of the stimulation signal 112 is identified as 50 MHz from the stimulation signal characteristic data stored in the database 208. The detection module 220 is operatively coupled to the stimulation component 110 to cause the stimulation component to generate the ideal stimulation signal 112. While the stimulation signal 112 is applied, detection module 220 measures ambient noise levels using a receiver 224 attached to an antenna 226.

A receiving module 228 of the detection component 116 is operatively coupled to the detection module 220 to receive the stimulated UEE signal 104 and measure characteristic data included in the UEE signal 104. The receiving module 228 digitizes the measured data to generate a digital measurement signal, as indicated by arrow 230.

Figure 2B:
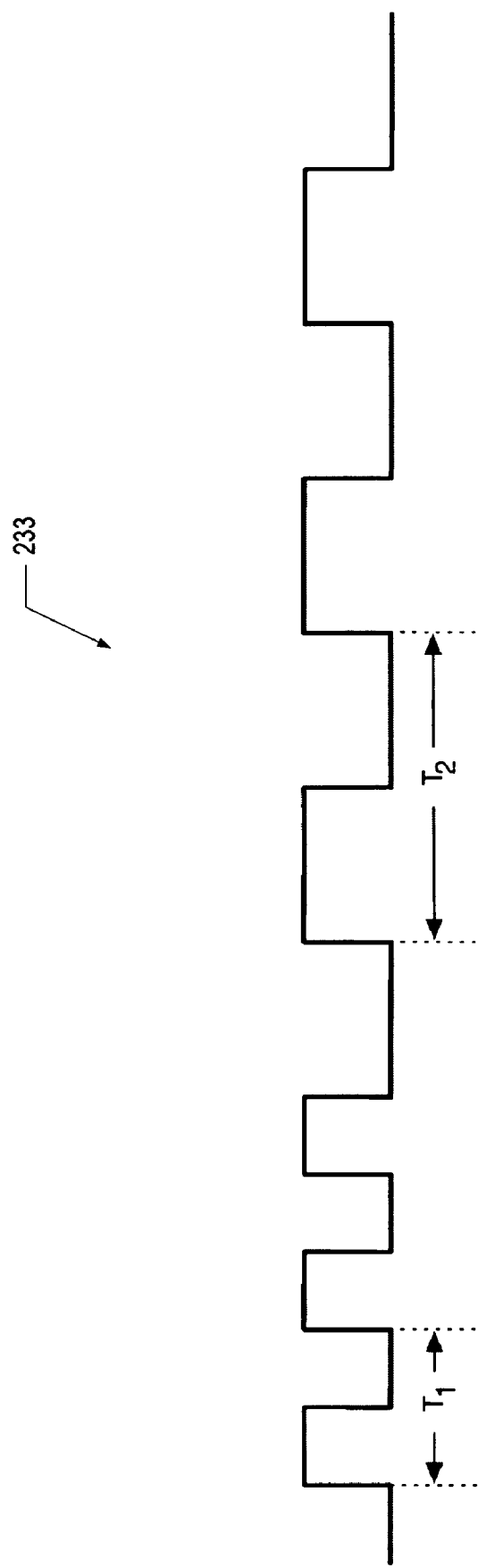
FIG. 2B depicts a series of connected square waves.

A processing module 232 of the detection component 116 is operatively coupled to the receiving module 224 and processes the digital measurement signal 230. Notably, the processing module 232 can be executed on the computing device 105 or a digital signal processor (not shown). Processing the digital measurement signal 230 can involve retrieving the ideal pulse template from the database 208 and information about the periodicity of the pulse that corresponds to the particular device identified in the detection command 222. Thereafter, the measurement signal 230 is correlated with the retrieved ideal pulse template in an attempt to bring the stimulated UEE signal 104 out of the noise. The periodicity of the UEE signal 104 can then be utilized by correlating with a single square wave having repetition rate that matches the expected repetition rate found during classification. Many devices have a repetition rate that varies. To capture this variation, several squares waves can be correlated, with the output of the correlation with the ideal pulse. A series of connected square waves 233 with periods T1 and T2 are shown in the FIG. 2B. The square waves are chosen to capture all the expected pulse repetition rates of the device. For example, the toy truck is correlated with at least three square waves having frequencies of 190 kHz, 200 kHz and 210 kHz or periods of 5.26 microseconds, 5 microseconds and 4.75 microseconds respectively.

A detection threshold module 234 operatively coupled to the processing module 232 uses the information obtained from these two correlations to calculate a normalized measure of similarity that is compared to a power threshold value. As described above, the two correlations provide information about the pulse shape of the UEE signal 104 for the particular device and the changing frequency of UEE signal 104 over time. The detection threshold module 234 can retrieve the expected threshold value that corresponds to the particular target device 102 from the database 208. If the calculated normalized threshold is greater than the expected threshold value, the target device 102 that corresponds to the retrieved ideal pulse template is deemed to be present and the computing device generates the alert 120 (FIG. 1A). In contrast, if the normalized threshold is not greater than the expected threshold value, the target device 102 that corresponds to the retrieved ideal pulse template is determined not to be present and the detection module retrieves a different ideal pulse template that corresponds to the next device to be tested. The correlation and threshold comparison process continues until a target device 102 is determined present, or the detection module has cycled through each of the test devices identified in the database 208.

Moreover, the detection component 116 can be configured to determine the distance between the antenna 226 and the target device 102 by measuring a time difference that corresponds to a period of time between a change in the stimulation signal 112 and a detected change in the emission characteristic of the stimulated UEE signal 104 received at the antenna 226. Notably, it is contemplated that an additional antenna 236 (shown in phantom) can be operatively coupled to the detection module 220 such that the target device 102 can be located with more precision. For example, a second time difference can be determined that corresponds to a period of time between a change in the stimulation signal and a detected change in the emission characteristic of the UEE signal 104 received at the additional antenna. The detection module 220 can determine a more precise location of the electronic device as a function of the measured first time difference based on the UEE signal 104 received at antenna 226 and the measured second time difference based on the UEE signal 104 received at an additional antenna 236.

In another aspect of the UEED system 100, device detection is implemented without the use of the stimulation component 110. For example, receiving module 228 receives a non-stimulated UEE signal 104 and measures characteristic data included in the UEE signal 104. The receiving module 228 digitizes the measured data to generate the digital measurement signal 230. The processing module 232 then processes the digital measurement signal 230 as described above.

Figure 7:
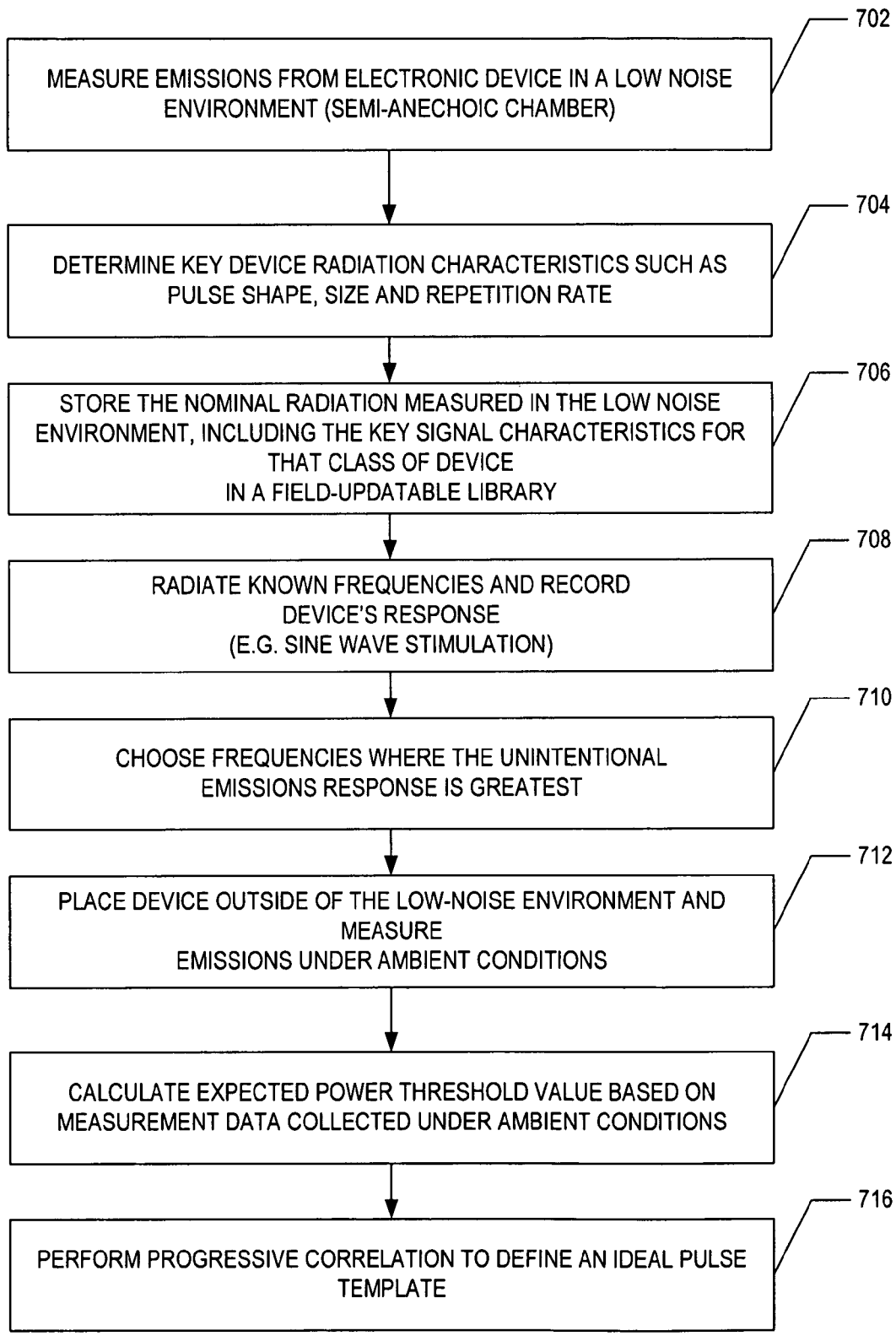
FIG. 7 is a flow chart illustrating a method for collecting characteristic data for a particular device based on its unintended electromagnetic emissions signal.

Referring to FIG. 7, a method for classifying one or more test devices 103 according to an aspect of the UEED system 100 is illustrated. At step 702, a test device 103 is placed in a low noise environment such as an anechoic chamber. The UEE signal 104 radiating from the test device 103 is measured and key characteristics of the UEE signal 104 such as pulse shape, pulse size, and pulse repetition rate are determined at step 704. At step 706, the key characteristic data for that device 103 (or class of devices) are stored in memory 108. At step 708, a stimulation signal 112 is radiated at various known frequencies, and the response on the UEE signal 104 radiating from the test device 103 is observed. The frequency (or frequencies) at which the simulation signal 102 produces the greatest response in the UEE signal 104 is stored in the memory at 710. At step 712, the test device 103 is placed outside of the low noise environment and the UEE signal 104 radiating from the test device 103 is measured under ambient conditions. An expected power threshold value is determined based on the measurement data collected under ambient conditions and stored in the memory at step 714. At step 716, a progressive cross-correlation process is performed using a statistically significant number of single pulses randomly selected from stored measurement data for the target device 102 to define an ideal pulse template that is also stored in the memory 108.

Figure 8:
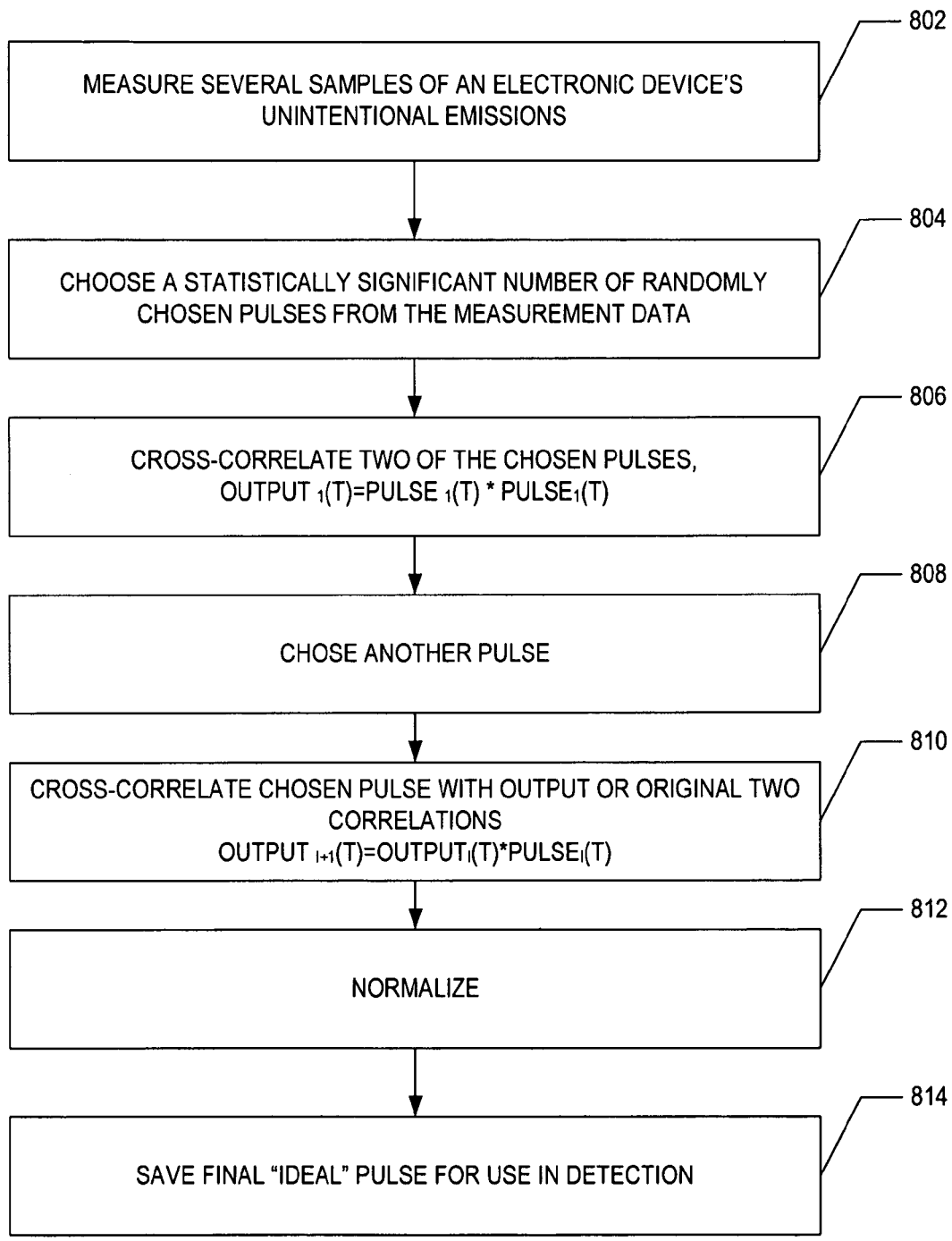
FIG. 8 is a flow chart illustrating a method for defining a pulse template for a particular device according to one aspect of the unintended electromagnetic emission detection system.

Referring to FIG. 8, a method for creating an ideal pulse template for each test device 103 is illustrated. At step 802, sample measurements are collected from the UEE signal 104 being emitted from the test device 103. A statistically significant number of random pulses are selected from the measurements at step 804. At step 806, a correlation process cross-correlates two of the selected pulses. Another pulse is selected at step 808, and the selected pulse is cross-correlated with the output of the prior correlation at step 810. The steps performed at 808 and 810 are repeated, or looped, until all pulses are correlated. At step 812, the result of the correlations is normalized to obtain the ideal pulse template. The ideal pulse template is saved in the memory 108 for use during device detection at step 814.

Figure 9:
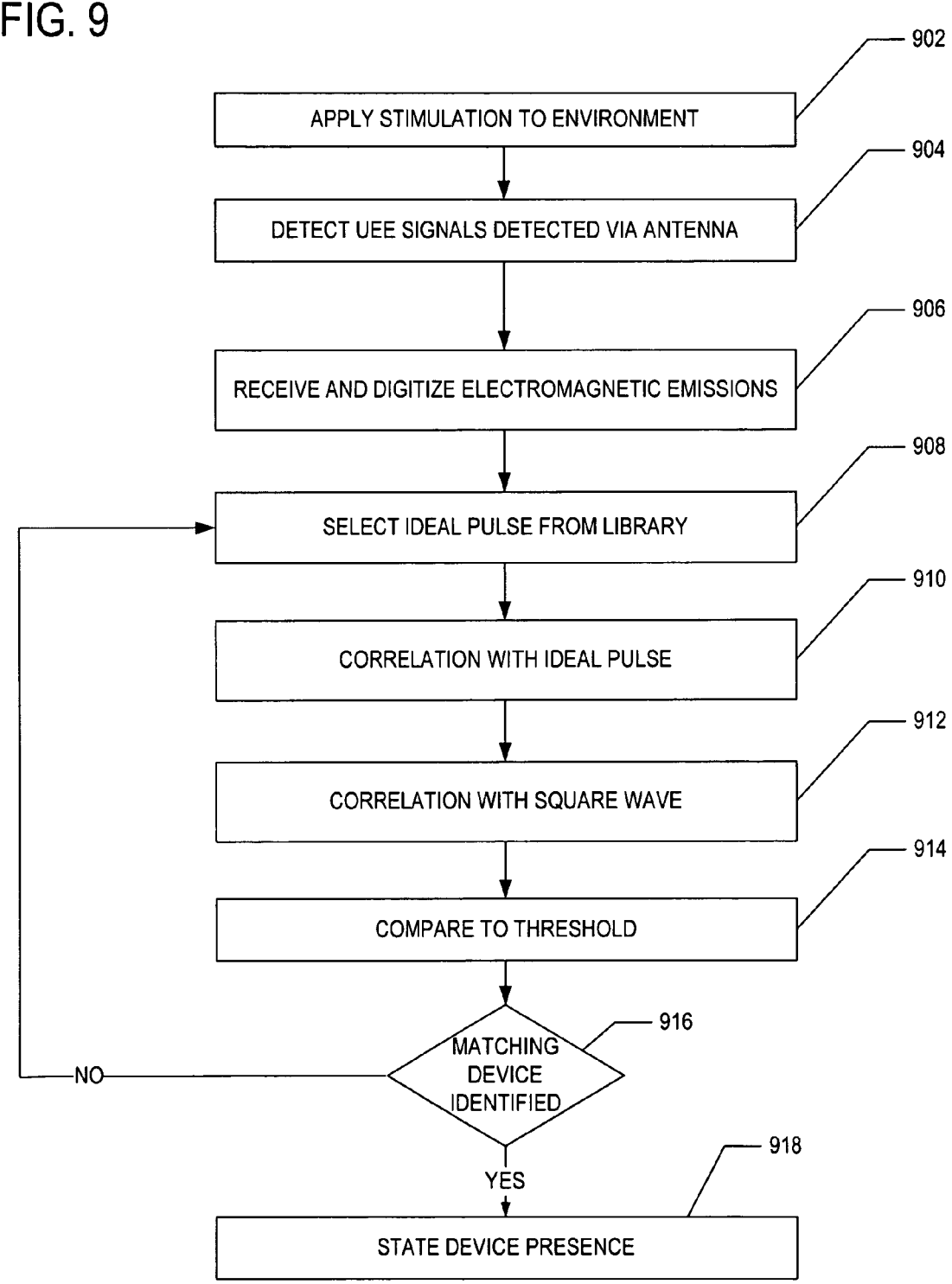
FIG. 9 is a flow chart illustrating a method for detecting a particular device based on its unintended electromagnetic emissions.
Figure 10A:
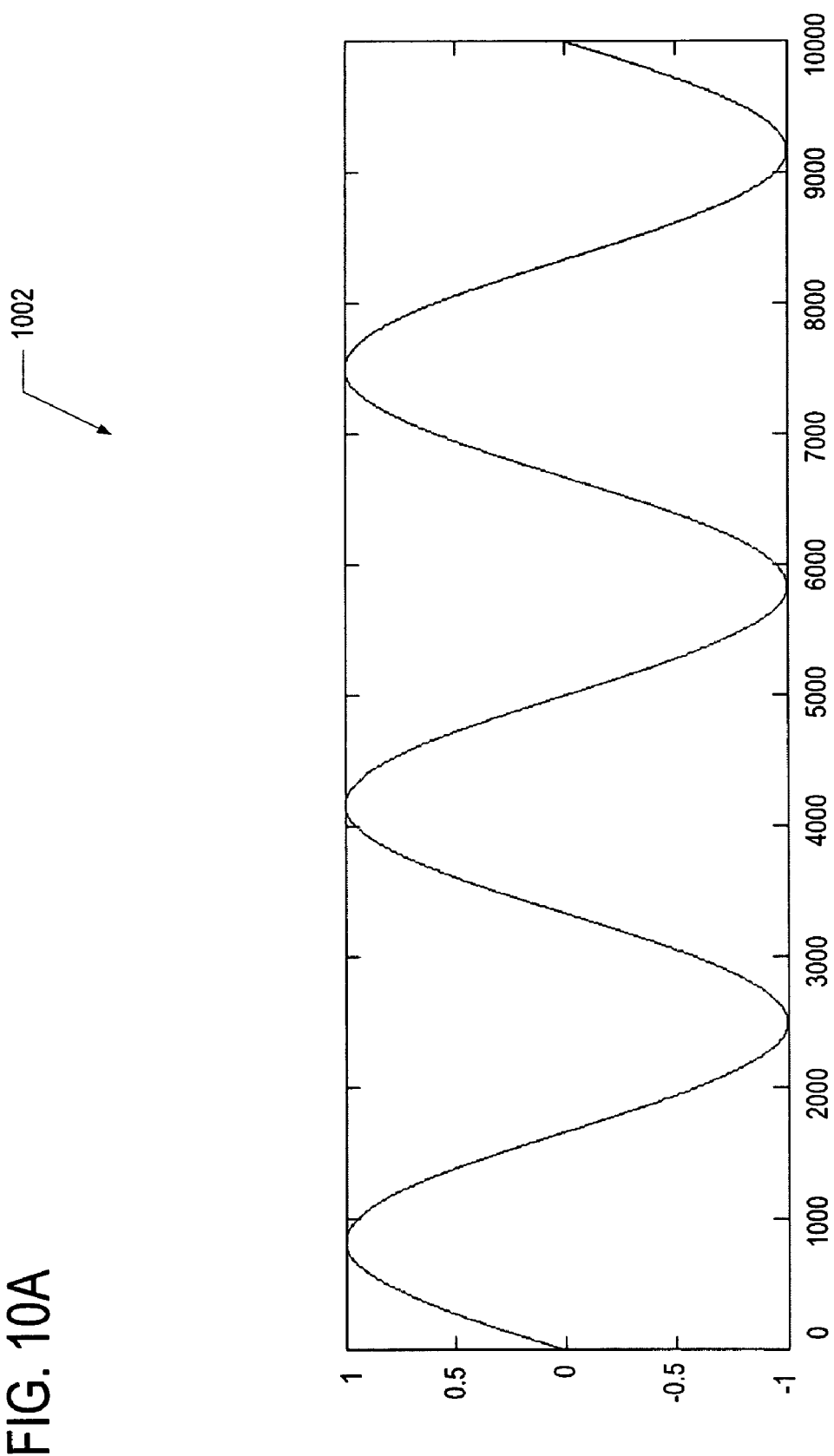
FIG. 10A depicts the amplitude of a possible a correlation sine wave over time.
Figure 10B:
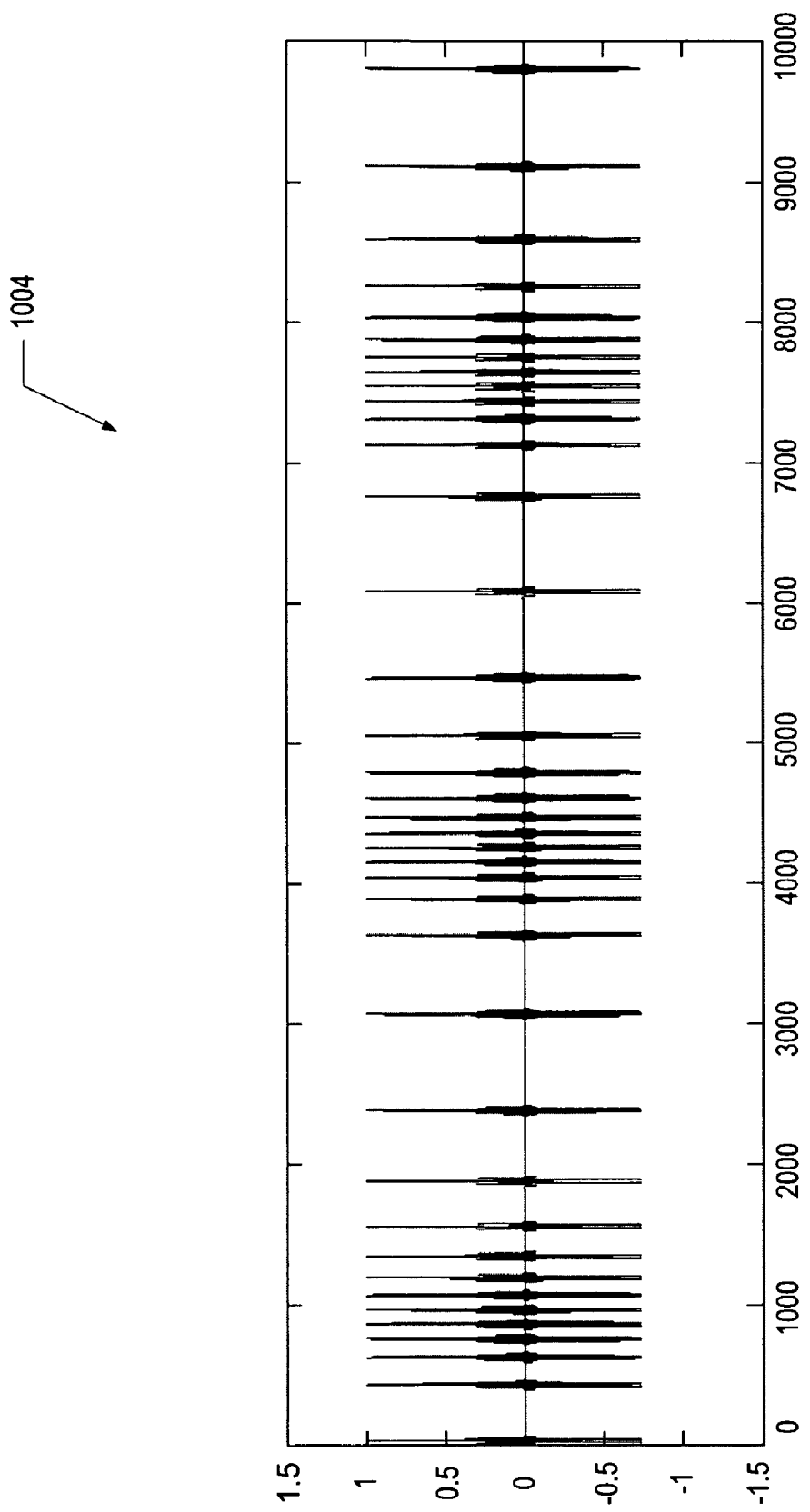
FIG. 10B depicts a modulated unintended electromagnetic emissions signal.

Referring to FIG. 9, a method for detecting a target device 102 according to an aspect of the UEED system 100 is illustrated. A stimulation signal 112 is applied to the environment in an area in which the target device 102 is suspected of being located at step 902. The stimulation signal 112 can consist of a single sine wave, a modulated sine wave, a square wave, or some other periodic signal. For example, FIG. 10A shows the modulated amplitude 1002 of a sine wave stimulation. FIG. 10B is a plot 1004 of how the UEE signal may react to the sine wave 1002. The sine wave effectively modulates the device's radiation signal in frequency. In other words, the period of the unintended emissions follows the amplitude of the stimulation signal as shown in the figure.

Referring again to FIG. 9, stimulated electromagnetic emissions (i.e., stimulated UEE signals 104) from the target device 102 can be detected via an antenna (e.g., antenna 226) at step 904. The detected UEE signal 104 is received and digitized to generate a digital measurement signal 230 at step 906. At step 908, an ideal pulse template is retrieved from the memory 108. The retrieved ideal pulse template can correspond to a particular test device 103 identified in the memory 108. The measurement signal 230 is correlated with the retrieved ideal pulse template in an attempt to separate the stimulated UEE signal 104 from noise at step 910. At step 912, a second correlation is performed with a square wave. A normalized measure of similarity is determined from the two correlations and compared to an expected threshold value at step 914. At decision point 916, if the normalized measure of similarity is greater than the expected threshold value, the presence of target device 102 is stated at step 918. In contrast, if the normalized threshold is not greater than the expected threshold value at decision point 916, a different ideal pulse template is selected from the memory at step 908. The different ideal pulse template corresponds to a next test device 103 identified in the memory 108. This process continues until a target device 102 is determined present, or an ideal pulse template has been selected and correlated for each test device 103 identified in the memory 108.

In operation, a computer readable medium (e.g., CRM) executes computer-executable instructions such as those illustrated in the FIGS. 7 and 8 to implement the UEED system 100.

The order of execution or performance of the operations in embodiments of the UEED system 100 illustrated and described herein is not essential, unless otherwise specified. That is, the operations may be performed in any order, unless otherwise specified, and embodiments of the UEED system 100 may include additional or fewer operations than those disclosed herein. For example, it is contemplated that executing or performing a particular operation before, contemporaneously with, or after another operation is within the scope of embodiments of the UEED system 100.

Embodiments of the UEED system 100 may be implemented with computer-executable instructions. The computer-executable instructions may be organized into one or more computer-executable components or modules. Aspects of the invention may be implemented with any number and organization of such components or modules. For example, aspects of the UEED system 100 are not limited to the specific computer-executable instructions or the specific components or modules illustrated in the figures and described herein. Other embodiments of the UEED system 100 may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized system for detecting a target electronic device emitting an unintentional electromagnetic emission (UEE) signal within an area, the computerized system comprising:
   a stimulation component for transmitting an ideal stimulation signal within the area in response to an input received from an input device, wherein the target electronic device is responsive to the ideal stimulation signal to emit a stimulated UEE signal; and
   a detection component for:
      receiving the stimulated UEE signal;
      converting the stimulated UEE signal to a digital signal;
      processing the digital signal to determine a characteristic of the stimulated UEE signal;
      comparing the determined characteristic to unique characteristic data stored in a memory, the unique characteristic data comprising unique characteristics for each of a plurality of test devices; and
      generating an alert signal when the determined characteristic of the stimulated UEE signal matches unique characteristic data stored in the memory.

2. The system of claim 1, wherein the unique characteristic data includes at least one or more of the following:
   a shape of the stimulated UEE signal;
   a rate at which stimulated UEE signals are emitted from each of the plurality of test devices in response to the ideal stimulation signal;
   a frequency or set of frequencies of the stimulated UEE signal;
   a change in the frequency of the stimulated UEE signal over a period of time; and
   a change in an emission characteristic of the stimulated UEE signal in response to the ideal stimulation signal.

3. The system of claim 1, wherein the ideal stimulation signal is a modulated signal having a predetermined frequency.

4. The system of claim 1 further including:
   an antenna for capturing the stimulated UEE signal from the target electronic device; and
   a receiver operatively coupled to the antenna for receiving the stimulated UEE signal and for transmitting the stimulated UEE signal to the detection component.

5. The system of claim 4 wherein the detection component processes the stimulated UEE signal by:
   retrieving an ideal pulse template from the memory that corresponds to a first one of the plurality of test devices identified in the memory;
   first correlating the digital signal with the ideal pulse template;
   second correlating the first correlation with a square wave to determine a normalized measure of similarity;
   comparing the normalized measure of similarity to a first threshold value stored in the memory that corresponds to a first test device;

generating the alert signal when the normalized measure of similarity is greater than or equal to the first threshold value; and retrieving a different ideal pulse template from the memory that corresponds to a second test device identified in the memory when the normalized measure of similarity is less than the first threshold value.

6. The system of claim 4 wherein the detection component further determines a distance between the antenna and the target electronic device by measuring a first time difference that corresponds to a period of time between a change in the ideal stimulation signal and a detected change in the characteristic of the stimulated UEE signal received at the antenna.

7. The system of claim 6 further including:
a second antenna operatively coupled to a signal generator for transmitting the ideal stimulation signal within the area and for receiving the stimulated UEE signal;
wherein the detection component determines another distance between the second antenna and the target electronic device by measuring a second time difference that corresponds to another period of time between the change in the ideal stimulation signal and another detected change in the characteristic of the stimulated UEE signal received at the second antenna, and wherein the detection component further determines a location of the target electronic device as a function of the first time difference and the second time difference.

8. The system of claim 1 further including a sound generator operatively coupled to the detection component, wherein the sound generator processes the alert signal and generates a unique sound indicative of a particular electronic device.

9. A method for detecting a target electronic device emitting an unintentional electromagnetic emission (UEE) signal within an area, the method comprising:
transmitting an ideal stimulation signal within the area in response to an input received from an input device, wherein the target electronic device is responsive to the ideal stimulation signal to emit a stimulated UEE signal;
receiving the stimulated UEE signal;
converting the stimulated UEE signal to a digital signal;
processing the digital signal to determine a characteristic of the stimulated UEE signal;
comparing the characteristic of the stimulated UEE signal to unique characteristic data stored in a memory, the unique characteristic data comprising unique characteristics for each of a plurality of test devices; and
generating an alert signal when the characteristic of the stimulated UEE signal matches the unique characteristic data stored in the memory.

10. The method of claim 9 wherein the unique characteristic data includes at least one or more of the following:
a shape of the stimulated UEE signal;
a rate at which stimulated UEE signals are emitted from each of the plurality of test devices in response to the ideal stimulation signal;
a frequency or set of frequencies of the stimulated UEE signal;
a change in the frequency of the stimulated UEE signal over a period of time; and
a change in an emission characteristic of the stimulated UEE signal in response to the ideal stimulation signal.

11. The method of claim 10 wherein the ideal stimulation signal is an amplitude modulated signal having a predetermined frequency.

12. The method of claim 9 further including:
capturing the stimulated UEE signal from the target electronic device with a first antenna; and
determining a distance between the first antenna and the target electronic device by measuring a first time difference that corresponds to a period of time between a change in the ideal stimulation signal and a detected change in a measured characteristic of the stimulated UEE signal received at the antenna.

13. The method of claim 12 wherein processing the stimulated UEE signal includes:
retrieving an ideal pulse template from the memory that corresponds to a first one of the plurality of test devices identified in the memory;
first correlating the digital signal with the ideal pulse template;
second correlating the first correlation with a square wave to determine a normalized measure of similarity;
comparing the normalized measure of similarity to a first threshold value stored in the memory that corresponds to the first one of the plurality of test devices;
generating the alert signal when the normalized measure of similarity is greater than or equal to the first threshold value; and
retrieving a different ideal pulse template from the memory that corresponds to a second one of the plurality of test devices identified in the memory when the normalized measure of similarity is less than the first threshold value.

14. The method of claim 12 further including:
transmitting the ideal stimulation signal within the area with a second antenna;
receiving the stimulated UEE signal at the second antenna;
determining another distance between the second antenna and the target electronic device by measuring a second time difference that corresponds to another period of time between the change in the ideal stimulation signal and another detected change in the measured characteristic of the stimulated UEE signal received at the second antenna; and
determining a location of the target electronic device as a function of the first time difference and the second time difference.

15. The method claim of 9 further includes processing the alert signal to generate a unique sound indicative of a particular electronic device.

16. The method claim of 9 further including processing the alert signal at a sound generator to generate a unique sound indicative of a particular electronic device.

17. A computerized system for detecting a target electronic device emitting an unintentional electromagnetic emission (UEE) signal within an area, the computerized system comprising:
a stimulation component for transmitting an ideal stimulation signal within the area in response to an input received from an input device, wherein the target electronic device is responsive to the ideal stimulation signal to emit a stimulated UEE signal;
a detection component for:
receiving the stimulated UEE signal;
converting the stimulated UEE signal to a digital signal;
processing the digital signal to determine a characteristic of the stimulated UEE signal and comparing the characteristic to unique characteristic data stored in a memory, the unique characteristic data comprising unique characteristics for each of a plurality of test devices, wherein the processing includes:
retrieving an ideal pulse template from the memory that corresponds to a first one of the plurality of test devices;

first correlating the digital signal with the ideal pulse template;

second correlating the first correlation with a square wave to determine a normalized measure of similarity; comparing the normalized measure of similarity to a first threshold value stored in the memory that corresponds to the first test device; and generating an alert signal when the normalized measure of similarity is greater than or equal to the first threshold value; and a sound generator operatively coupled to the detection component for processing the alert signal to generate a unique sound indicative of a particular electronic device.

18. The system of claim 17 further including:

an antenna for capturing the stimulated UEE signal from the target device; and a receiver operatively coupled to the antenna for receiving the stimulated UEE signal and for transmitting the stimulated UEE signal to the detection component.

19. The system of claim 17 wherein the detection component further processes the stimulated UEE signal by retrieving a different ideal pulse template from the memory that corresponds to a second one of the plurality of test devices when the normalized measure of similarity is less than the first threshold value.

20. The system of claim 18 wherein the detection component further determines a distance between the antenna and the target electronic device by measuring a time difference that corresponds to a period of time between a change in the ideal stimulation signal and a detected change in a measured characteristic of the stimulated UEE signal received at the antenna.

* * * * *